US008958742B2

(12) United States Patent
Lee et al.

(10) Patent No.: US 8,958,742 B2
(45) Date of Patent: Feb. 17, 2015

(54) MOBILE TERMINAL AND METHOD FOR OPERATING THE SAME

(71) Applicant: LG Electronics Inc, Seoul (KR)

(72) Inventors: Seokhee Lee, Seoul (KR); Jeonghwan Hwang, Seoul (KR); Sunjung Hwang, Seoul (KR); Sungmok Shin, Seoul (KR)

(73) Assignee: LG Electronics, Inc., Seoul (KR)

( * ) Notice: Subject to any disclaimer, the term of this patent is extended or adjusted under 35 U.S.C. 154(b) by 81 days.

(21) Appl. No.: 13/840,508

(22) Filed: Mar. 15, 2013

(65) Prior Publication Data

US 2013/0332956 A1  Dec. 12, 2013

(30) Foreign Application Priority Data

Jun. 8, 2012  (KR) ........................ 10-2012-0061624

(51) Int. Cl.
| | | |
|---|---|---|
| H04H 20/71 | (2008.01) | |
| H04H 60/09 | (2008.01) | |
| H04N 21/485 | (2011.01) | |
| H04M 1/725 | (2006.01) | |
| H04N 21/41 | (2011.01) | |
| H04N 21/422 | (2011.01) | |
| H04N 21/439 | (2011.01) | |
| H04N 21/81 | (2011.01) | |
| H04N 5/44 | (2011.01) | |
| H04N 5/445 | (2011.01) | |

(52) U.S. Cl.
CPC ....... *H04N 21/4852* (2013.01); *H04M 1/72533* (2013.01); *H04M 1/72558* (2013.01); *H04M 1/7253* (2013.01); *H04N 21/4126* (2013.01); *H04N 21/4222* (2013.01); *H04N 21/4396* (2013.01); *H04N 21/8106* (2013.01); *H04N 2005/4425* (2013.01); *H04N 2005/44517* (2013.01)
USPC ....... 455/3.03; 455/3.01; 455/3.04; 455/3.05; 455/3.06; 455/418; 455/420; 455/41.2; 455/41.3; 455/500; 455/502; 455/556.1; 345/1.1; 345/1.2; 348/14.01; 348/14.02; 348/14.03; 348/14.04; 348/14.05; 348/734

(58) Field of Classification Search
USPC ............ 455/3.01, 3.03, 3.04, 3.05, 3.06, 418, 455/420, 41.2, 41.3, 500, 502, 503, 556.1, 455/566; 345/1.1, 1.2, 2.1, 2.3; 348/14.01, 348/14.02, 14.03, 14.04, 14.05, 734
See application file for complete search history.

(56) References Cited

U.S. PATENT DOCUMENTS

| | | | |
|---|---|---|---|
| 7,034,891 B2 * | 4/2006 | Joung et al. ................... 348/565 |
| 7,327,385 B2 * | 2/2008 | Yamaguchi ................ 348/207.1 |
| 7,411,491 B2 * | 8/2008 | Klabunde et al. ........ 340/539.12 |
| 8,102,836 B2 * | 1/2012 | Jerlhagen et al. ............. 370/350 |
| 8,213,858 B2 * | 7/2012 | Wei et al. ..................... 455/3.05 |
| 8,285,223 B2 * | 10/2012 | Unger .......................... 455/67.7 |
| 8,406,245 B2 * | 3/2013 | Raveendran .................. 370/412 |
| 8,548,449 B2 * | 10/2013 | Axelrod et al. ............... 455/415 |
| 2003/0131360 A1 * | 7/2003 | Joung et al. ................... 725/118 |

(Continued)

*Primary Examiner* — Tuan A Tran
(74) *Attorney, Agent, or Firm* — Birch, Stewart, Kolasch & Birch, LLP

(57) ABSTRACT

A mobile terminal and a method for operating the same are discussed. The method for operating the mobile terminal includes displaying on the mobile terminal a remote control screen for remotely controlling an image display apparatus, entering a wireless audio reception mode if a wireless audio reception mode start signal is received during the displaying of the remote control screen, and displaying on the mobile terminal a wireless audio reception mode screen. Accordingly, it is possible to improve user convenience.

20 Claims, 29 Drawing Sheets

(a)   (b)

(56) References Cited

U.S. PATENT DOCUMENTS

| | | | |
|---|---|---|---|
| 2005/0289631 A1* | 12/2005 | Shoemake | 725/118 |
| 2006/0164328 A1* | 7/2006 | Jaff | 345/2.3 |
| 2006/0189271 A1* | 8/2006 | Wu et al. | 455/3.01 |
| 2008/0051027 A1* | 2/2008 | Lee | 455/3.06 |
| 2008/0225771 A1* | 9/2008 | Guo et al. | 370/312 |
| 2010/0317332 A1* | 12/2010 | Bathiche et al. | 455/418 |
| 2011/0129196 A1 | 6/2011 | Hayashi | |
| 2012/0178368 A1* | 7/2012 | Fleck et al. | 455/41.2 |

* cited by examiner

IP Streaming Packet Structure (a)              (b)

FIG. 16A
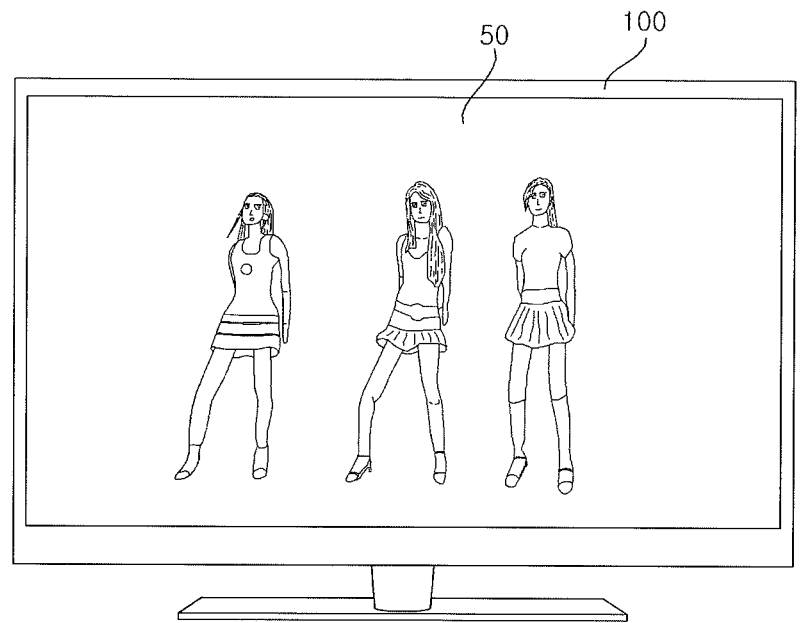
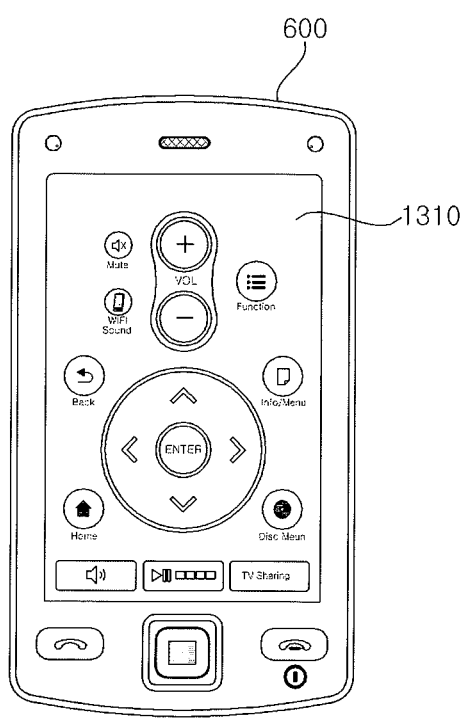

FIG. 16C
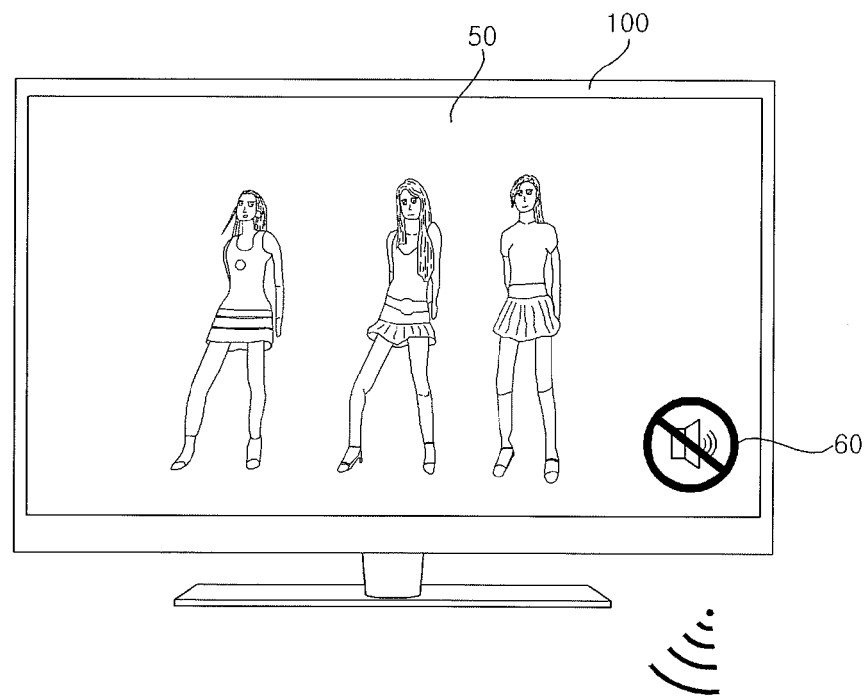
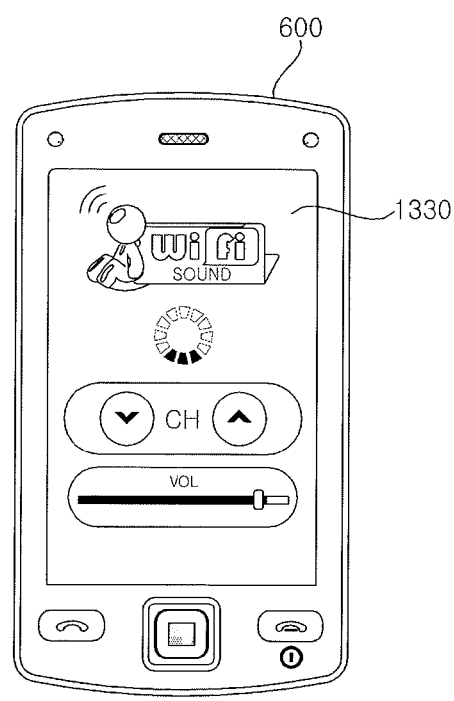

MOBILE TERMINAL AND METHOD FOR OPERATING THE SAME

CROSS-REFERENCE TO RELATED APPLICATION

This application claims priority to and the benefit of Korean Patent Application No. 10-2012-0061624, filed on Jun. 8, 2012 in the Korean Intellectual Property Office, the disclosure of which is incorporated herein by reference.

BACKGROUND OF THE INVENTION

1. Field of the Invention

Embodiments of the invention relate to a mobile terminal and a method for operating the same, and more particularly to a mobile terminal and a method for operating the same, which are capable of improving user convenience.

2. Description of the Related Art

A mobile terminal is a portable device having at least one of a voice and video communication function, an information input/output function and a data storage function. Such a mobile terminal has complicated functions such as photographing of photos, capturing of moving images, playback of music files or moving image files, reception of games or broadcasts, or wireless Internet and has been implemented as a multimedia player, as the functions thereof have been diversified.

SUMMARY OF THE INVENTION

Therefore, the invention has been made in view of the above problems, and it is an object of the invention to provide a mobile terminal and a method for operating the same, which are capable of improving user convenience.

It is another object of the invention to provide a mobile terminal and a method for operating the same, which are capable of conveniently transmitting and playing back audio data between an image display apparatus and the mobile terminal in a wireless manner.

In accordance with an aspect of the invention, the above and other objects can be accomplished by the provision of a method for operating a mobile terminal including displaying on the mobile terminal a remote control screen for remotely controlling an image display apparatus, entering a wireless audio reception mode if a wireless audio reception mode start signal is received during the displaying of the remote control screen, and displaying on the mobile terminal a wireless audio reception mode screen.

In accordance with another aspect of the invention, there is provided a mobile terminal including an audio output module, a display configured to display a remote control screen for remotely controlling an image display apparatus, and a controller configured to control entrance into a wireless audio reception mode if a wireless audio reception mode start signal is received during display of the remote control screen and to control display of a wireless audio reception mode screen.

BRIEF DESCRIPTION OF THE DRAWINGS

The above and other objects, features and other advantages of the invention will be more clearly understood from the following detailed description taken in conjunction with the accompanying drawings, in which.

DETAILED DESCRIPTION OF THE EMBODIMENTS

Example embodiments of the invention will be described with reference to the attached drawings.

The terms "module" and "unit" attached to describe the names of components are used herein to help the understanding of the components and thus they should not be considered as having specific meanings or roles. Accordingly, the terms "module" and "unit" may be used interchangeably.

Figure 1:
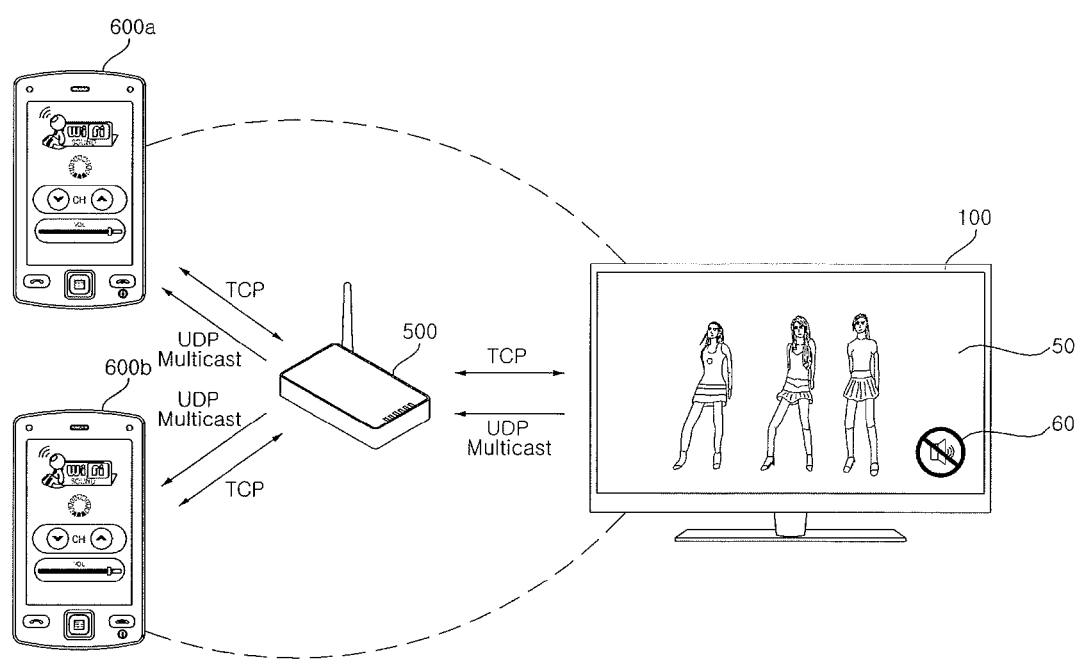
FIG. 1 is a block diagram showing a configuration of an image display system according to an embodiment of the invention.

FIG. 1 is a diagram showing an image display system according to an embodiment of the invention.

Referring to FIG. 1, the image display system 10 according to the embodiment of the invention may include an image display apparatus 100, a mobile terminal 600 (e.g., mobile terminals 600*a* and 600*b*) and a network router 500.

The image display apparatus 100 may receive content. For example, the image display apparatus may receive a broadcast signal via an antenna, receive an external input signal from an external device via a High-Definition Multimedia Interface (HDMI) terminal, or receive a streaming signal from a predetermined network router 500 via a network.

The image display apparatus 100 may process the received broadcast signal, external input signal or streaming signal, display video on a display 180 and output audio.

In the embodiment of the invention, the image display apparatus 100 wirelessly transmits audio data to an external device, for example, a mobile terminal 600, in a wireless audio transmission mode. For audio transmission, the image display apparatus 100 may perform direct or indirect communication with the mobile terminal.

In FIG. 1, data is exchanged between the image display apparatus 100 and the mobile terminal 600 via the network router 500.

The image display apparatus 100 may include a TV, a monitor, a computer, a laptop, a tablet PC, etc., all of which are capable of displaying broadcast content.

The network router 500 provides a network such that data is exchanged between the image display apparatus 100 and the mobile terminal 600.

For example, if the network router 500 is a wireless network router, a plurality of virtual IP addresses may be internally allocated to the image display apparatus 100 and the mobile terminal 600, respectively, while utilizing the same external Internet Protocol (IP) address. Wireless channels may be allocated in correspondence with the virtual IP addresses.

That is, the network router 500 may allocate a first wireless channel to the image display apparatus 100 in correspondence with a first virtual IP address, allocate a second wireless channel to a first mobile terminal 600a in correspondence with a second virtual IP address, and allocate a third wireless channel to a second mobile terminal 600b in correspondence with a third virtual IP address.

The network router 500 controls data exchange between the image display apparatus 100 and the mobile terminals 600a and 600b via the channels respectively allocated thereto.

If an electronic apparatus capable of performing wireless data communication is added to a wireless network provided by the network router 500, the network router 500 may additionally allocate a virtual IP address and a wireless channel to the electronic apparatus, as described above.

The network router 500 may provide environment information of the wireless channels respectively corresponding to the image display apparatus 100 and the mobile terminals 600a and 600b. For example, the network router may provide security information, channel name information, signal intensity information etc., of the wireless channels.

The wireless network provided by the network router 500 may be a WiFi based wireless network.

The mobile terminal 600 may perform voice communication or data communication and examples thereof include a mobile phone, a smart phone, a laptop, a tablet PC, etc.

In the embodiment of the invention, the mobile terminal 600 may wirelessly receive audio data from an external device, for example, the image display apparatus 100, in a wireless audio reception mode. For audio data reception, the mobile terminal 600 may perform direct or indirect communication with the image display apparatus 100.

In the embodiment of the invention, if the wireless audio transmission/reception mode is performed, first, the image display apparatus 100 and the mobile terminals 600a and 600b are synchronized using a first wireless communication method. That is, control data may be transmitted from the mobile terminals 600a and 600b to the image display apparatus 100 and feedback data corresponding to the control data may be transmitted from the image display apparatus 100 to the mobile terminals 600a and 600b.

The control data may include at least one of wireless audio transmission mode start or end information, wireless channel setting request information, wireless channel change request information, allocated wireless channel information, decoding information, wireless channel environment information or playback delay information. The feedback data may include at least one of information about the number of channels of audio data to be transmitted, encoding state information, encoding scheme information, playback point-of-time information, or current time information.

In order to secure data communication reliability, the first wireless communication method is a two-way communication method and may be a transmission control protocol (TCP) based communication method.

For example, if a wireless audio reception mode start signal is transmitted as TCP packet data from the first mobile terminal 600a to the image display apparatus 100 via the wireless router (or the network router) 500, the image display apparatus 100 may transmit information about the number of channels of the audio data to be transmitted of multimedia data played back by the image display apparatus, encoding state information, encoding scheme information, etc., to the first mobile terminal 600a via the wireless router 500, for the wireless audio transmission mode.

Next, if synchronization between the image display apparatus 100 and the mobile terminals 600a and 600b is completed, the image display apparatus 100 may transmit audio data to the mobile terminals 600a and 600b via the wireless router 500 using a second wireless communication method different from the first wireless communication method.

For low-delay streaming of audio data and multi-user support, the second wireless communication method may be a one-way and multicast based communication method and may be a real time transmission protocol (RTP)/user datagram protocol (UDP) based communication method.

For example, if synchronization between the first and second mobile terminals 600a and 600b and the image display apparatus 100 is completed, the image display apparatus 100 may transmit an RTP/UDP packet including an audio signal of a broadcast image which is currently being played back by the image display apparatus 100 to the first and second mobile terminals 600a and 600b via the wireless router 500.

The transmitted audio signal may be adaptively changed depending on whether the audio signal can be decoded in the mobile terminal, a wireless channel environment, playback delay of the mobile terminal, etc. For example, various audio signals such as a demultiplexed audio signal of a stereo channel, a demultiplexed audio signal of a mono channel, a decoded audio signal of a stereo channel, a decoded audio signal of a mono channel, an encoded audio signal of a stereo channel and an encoded audio signal of a mono channel may be transmitted from the image display apparatus 100 to the mobile terminals 600a and 600b.

When the audio data is transmitted, playback point-of-time information of the audio data, current time information, etc., may be transmitted to the mobile terminals 600a and 600b. At this time, the playback point-of-time information and the current time information may be transmitted to the mobile terminals 600a and 600b via the wireless router 500 together with the audio data in the form of an RTP/UDP packet or may be transmitted to the mobile terminals 600a and 600b via the wireless router 500 as TCP packet data separately from the audio data.

Unlike FIG. 1, wireless data communication between the image display apparatus 100 and the mobile terminals 600a and 600b is possible without the network router 500. At this time, WiFi Direct based data communication may be performed between the image display apparatus 100 and the mobile terminals 600a and 600b.

Figure 2:
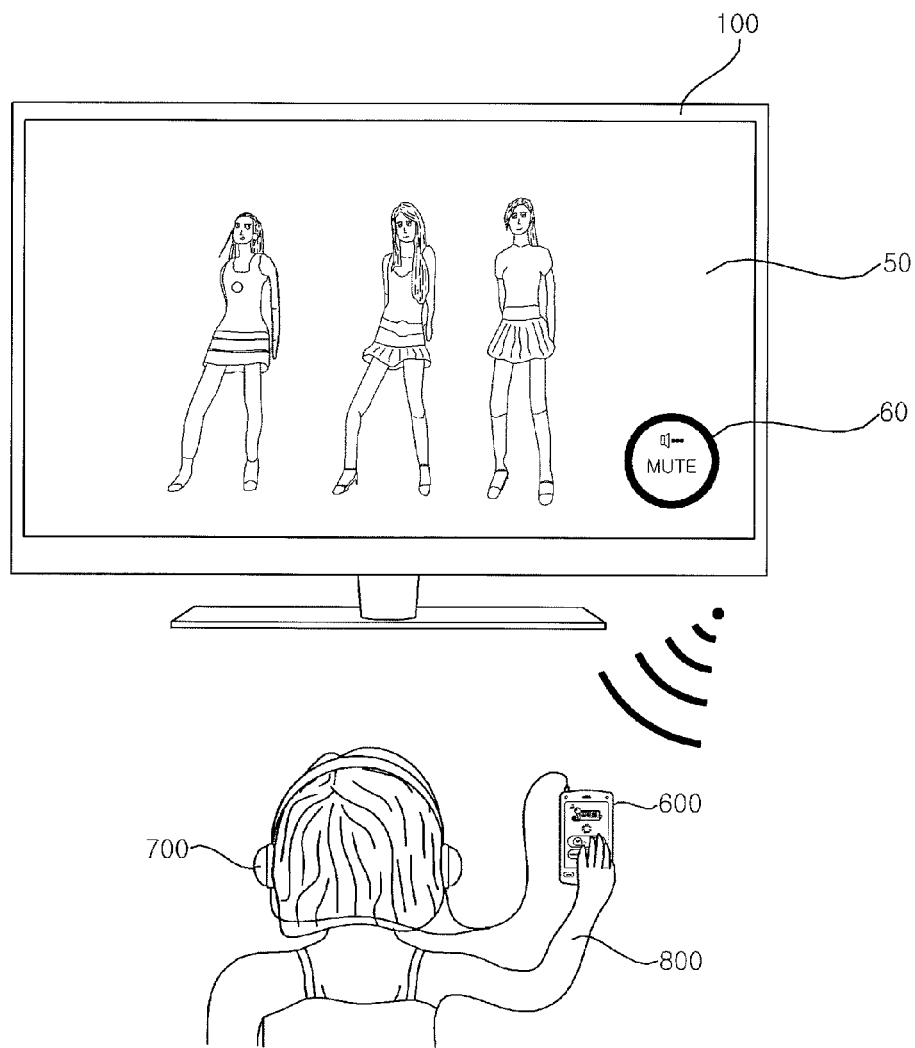
FIG. 2 is a diagram showing an instance in which a user listens to an audio signal using the image display system of FIG. 1.

FIG. 2 is a diagram showing an instance in which a user listens to an audio signal using the image display system of FIG. 1.

Referring to FIG. 2, if a wireless audio transmission/reception mode is initiated in the image display system according to the embodiment of the invention, video data 50 of multimedia data displayed on the image display apparatus 100 may be continuously played back and displayed and audio data of the multimedia data may be transmitted to the mobile terminal 600. The mobile terminal 600 play back the audio data received from the image display apparatus 100.

Then, a user 800 may conveniently listen to audio data corresponding to the video data of the multimedia data displayed on the image display apparatus 100 using an earphone 700 through the mobile terminal 600.

In particular, in the wireless audio transmission mode, an audio output unit 185 of the image display apparatus 100 is in a mute mode and thus may not output an audio signal directly. Thus, other users who do not wish to listen to the audio data may not listen to the audio signal when the image display apparatus 100 plays back the multimedia data.

In FIG. 2, an object 60 representing the mute mode is displayed on the display 180 of the image display apparatus 100.

Figure 3:
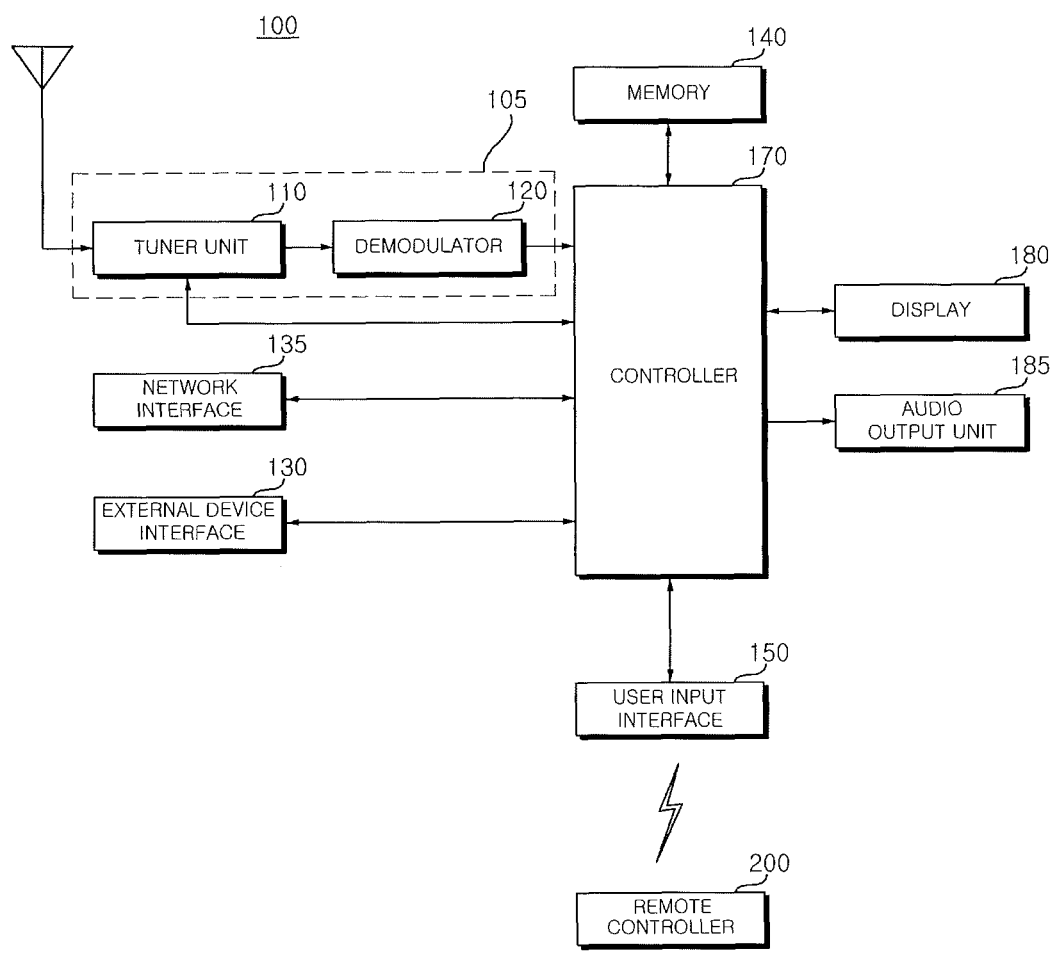
FIG. 3 is a block diagram showing the internal configuration of an image display apparatus of FIG. 1.

FIG. 3 is a block diagram showing the internal configuration of the image display apparatus of FIG. 1.

Referring to FIG. 3, the image display apparatus 100 according to the embodiment of the invention includes a broadcast reception unit 105, an external device interface 130, a memory 140, a user input interface 150, a sensor unit, a controller 170, a display 180, an audio output unit 185 and a remote controller 200.

The broadcast reception unit 105 may include a tuner unit 110, a demodulator 120 and/or a network interface 135. As needed, the broadcast reception unit 105 may include only the tuner unit 110 and the demodulator 120 or only the network interface 135.

The tuner unit 110 tunes to a Radio Frequency (RF) broadcast signal corresponding to a channel selected by a user from among RF broadcast signals received through an antenna or RF broadcast signals corresponding to all channels previously stored in the image display apparatus. The tuned RF broadcast is converted into an Intermediate Frequency (IF) signal or a baseband Audio/Video (AV) signal.

For example, the tuned RF broadcast signal is converted into a digital IF signal DIF if it is a digital broadcast signal and is converted into an analog baseband AV signal (Composite Video Banking Sync/Sound Intermediate Frequency (CVBS/SIF)) if it is an analog broadcast signal. That is, the tuner unit 110 may process a digital broadcast signal or an analog broadcast signal. The analog baseband AV signal (CVBS/SIF) output from the tuner unit 110 may be directly input to the controller 170.

The tuner unit 110 may be capable of receiving RF broadcast signals from an Advanced Television Systems Committee (ATSC) single-carrier system or from a Digital Video Broadcasting (DVB) multi-carrier system.

The tuner unit 110 may sequentially select a number of RF broadcast signals corresponding to all broadcast channels previously stored in the image display apparatus by a channel storage function from a plurality of RF signals received through the antenna and may convert the selected RF broadcast signals into IF signals or baseband A/V signals.

The tuner unit 110 may include a plurality of tuners in order to receive broadcast signals of a plurality of channels. Alternatively, the tuner unit may include a single tuner for simultaneously receiving broadcast signals of a plurality of channels.

The demodulator 120 receives the digital IF signal DIF from the tuner unit 110 and demodulates the digital IF signal DIF.

The demodulator 120 may perform demodulation and channel decoding, thereby obtaining a stream signal TS. The stream signal may be a signal in which a video signal, an audio signal and a data signal are multiplexed.

The stream signal output from the demodulator 120 may be input to the controller 170 and thus subjected to demultiplexing and A/V signal processing. The processed video and audio signals are output to the display 180 and the audio output unit 185, respectively.

The external device interface 130 may serve to transmit or receive data to or from an external device connected thereto. For interfacing, the external device interface 130 may include an A/V Input/Output (I/O) unit and/or a wireless communication module.

The external device interface 130 may be connected to an external device such as a Digital Versatile Disc (DVD) player, a Blu-ray player, a game console, a camera, a camcorder, or a computer (e.g., a laptop computer), wirelessly or by wire so as to perform an input/output operation with respect to the external device.

The A/V I/O unit externally receives video and audio signals from the external device. The wireless communication unit may perform short-range wireless communication with another electronic apparatus.

The network interface 135 serves as an interface between the image display apparatus 100 and a wired/wireless network such as the Internet. The network interface 135 may include a wired communication unit or a wireless communication unit.

For example, the network interface 135 may receive content or data provided by an Internet or content provider or a network operator over a network.

The network interface 135 performs data communication with the network router 500 and can perform data exchange within the network of the network router 500.

In the embodiment of the invention, in the wireless audio transmission mode, for synchronization with the mobile terminal 600, the network interface 135 may receive control data of a TCP packet format from the mobile terminal 600 via the network router 500 and transmit feedback data of a TCP packet format to the mobile terminal 600 via the network router 500.

After synchronization is completed, the network interface 135 may transmit audio data of an RTP/UDP packet format corresponding to the multimedia data played back by the image display apparatus to the mobile terminal 600 via the network router 500.

The memory 140 may store various programs necessary for the controller 170 to process and control signals, and may also store processed video, audio and data signals.

The memory 140 may temporarily store a video, audio and/or data signal received from the external device interface 130. The memory 140 may store information about a predetermined broadcast channel by the channel storage function of a channel map.

While the memory 140 is shown in FIG. 3 as being configured separately from the controller 170, to which the invention is not limited, the memory 140 may be incorporated into the controller 170.

The user input interface 150 transmits a signal input by the user to the controller 170 or transmits a signal received from the controller 170 to the user.

For example, the user input interface 150 may transmit/receive various user input signals such as a power-on/off signal, a channel selection signal, and a screen setting signal from a remote controller 200, may provide the controller 170 with user input signals received from local keys, such as inputs of a power key, a channel key, and a volume key, and setting values, or provide the controller 170 with a user input signal received from a sensor unit for sensing a user gesture, or transmit a signal received from the controller 170 to a sensor unit.

The controller 170 may demultiplex the stream signal received from the tuner unit 110, the demodulator 120, or the external device interface 130 into a number of signals, process the demultiplexed signals into audio and video data, and output the audio and video data.

The video signal processed by the controller 170 may be displayed as an image on the display 180. The video signal processed by the controller 170 may also be transmitted to an external output device through the external device interface 130.

The audio signal processed by the controller 170 may be output to the audio output unit 185. Also, the audio signal processed by the controller 170 may be transmitted to the external output device through the external device interface 130.

The controller 170 may include a DEMUX, a video processor, etc., which will be described in detail later with reference to FIG. 4.

The controller 170 may control the overall operation of the image display apparatus 100. For example, the controller 170 controls the tuner unit 110 to tune to an RF signal corresponding to a channel selected by the user or a previously stored channel.

The controller 170 may control the image display apparatus 100 by a user command input through the user input interface 150 or an internal program.

The controller 170 may control the display 180 to display images. The image displayed on the display 180 may be a Two-Dimensional (2D) or Three-Dimensional (3D) still or moving image.

The controller 170 recognizes the position of the user based on an image captured by a camera unit. For example, a distance (z-axis coordinate) between the user and the image display apparatus 100 may be detected. An x-axis coordinate and a y-axis coordinate in the image display apparatus 100 corresponding to the position of the user may be detected.

A channel browsing processor for generating a thumbnail image corresponding to a channel signal or an external input signal may be further included. The channel browsing processor may receive the stream signal TS output from the demodulator 120 or the stream signal output from the external device interface 130, extract an image from the received stream signal, and generate a thumbnail image. The generated thumbnail image may be decoded into a stream form to be input to the controller 170 together with the decoded image. The controller 170 may display a thumbnail list including a plurality of thumbnail images on the display 180 using the input thumbnail image.

The thumbnail list may be displayed in a brief viewing method of displaying the thumbnail list in a part of an area in a state of displaying a predetermined image or may be displayed in a full viewing method of displaying the thumbnail list in a full area. The thumbnail images in the thumbnail list may be sequentially updated.

The display 180 converts the video signal, the data signal, the OSD signal and the control signal processed by the controller 170 or the video signal, the data signal and the control signal received by the external device interface 130 and generates a drive signal.

The display 180 may be a Plasma Display Panel (PDP), a Liquid Crystal Display (LCD), an Organic Light-Emitting Diode (OLED) display or a flexible display. In particular, the display 180 may be a 3D display.

For viewing a 3D image, the display 180 may be divided into a supplementary display method and a single display method.

In the single display method, a 3D image is implemented on the display 180 without a separate subsidiary device, for example, glasses. The single display method may include, for example, a lenticular method, a parallax barrier, or the like.

In the supplementary display method, a 3D image is implemented on the display 180 using a subsidiary device as a viewing device. The supplementary display method includes various methods such as a Head-Mounted Display (HMD) method or a glasses method.

The glasses method may be divided into a passive method such as a polarized glasses method and an active method such as a shutter glasses method. The HMD method may be divided into a passive method and an active method.

The viewing device may be 3D glasses capable of enabling a user to view a 3D image. The 3D glasses may include passive type polarized glasses, active type shutter glasses or HMD type glasses.

The viewing device may be glasses capable of enabling users to view different images. For example, a first viewing device may enable a user to view only a first image and a second viewing device may enable a user to view only a second image.

If the display 180 is a touchscreen, the display 180 may function as not only an output device but also as an input device.

The audio output unit 185 receives the audio signal processed by the controller 170 and outputs the received audio signal as sound.

The camera unit captures images of a user. The camera unit may be implemented by one camera, but the invention is not limited thereto. That is, the camera unit may be implemented by a plurality of cameras. The camera unit may be embedded in the image display apparatus 100 at the upper side of the display 180 or may be separately provided. Image information captured by the camera unit may be input to the controller 170.

The controller 170 may sense a user gesture from an image captured by the camera unit, a signal sensed by the sensor unit, or a combination of the captured image and the sensed signal.

The remote controller 200 transmits user input to the user input interface 150. For transmission of user input, the remote controller 200 may use various communication techniques such as IR communication, RF communication, Bluetooth, Ultra Wideband (UWB) and ZigBee. In addition, the remote controller 200 may receive a video signal, an audio signal or a data signal from the user input interface 150 and output the received signals visually or audibly.

The above-described image display apparatus 100 may be a fixed or mobile digital broadcast receiver capable of receiving a digital broadcast.

The block diagram of the image display apparatus 100 illustrated in FIG. 3 is only by example. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the invention and thus specific operations or devices should not be construed as limiting the scope and spirit of the invention.

Unlike FIG. 3, the image display apparatus 100 may not include the tuner unit 110 and the demodulator 120 shown in FIG. 3 and may receive broadcast content via the network interface 135 or the external device interface 135 and play back the broadcast content.

Figure 4:
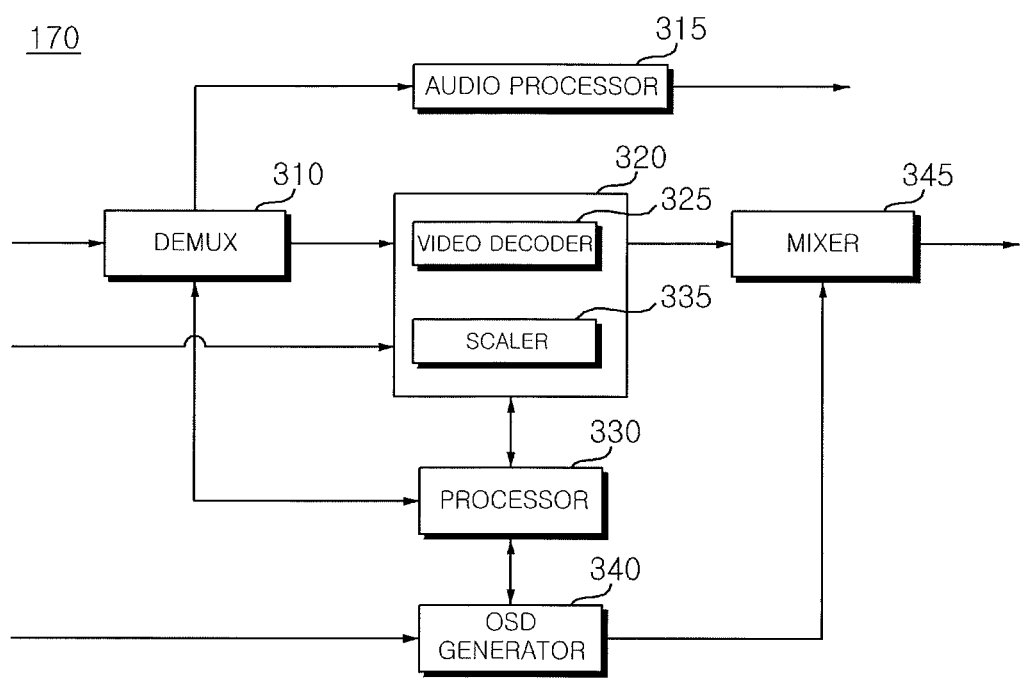
FIG. 4 is a block diagram showing an example of a controller of FIG. 3.

FIG. 4 is a block diagram showing the internal configuration of the controller illustrated in FIG. 3.

Referring to FIG. 4, the controller 170 according to the embodiment of the invention may include a DEMUX 310, an audio processor 315, a video processor 320, a processor 330, an OSD generator 340 and a mixer 345. The controller 170 may further include a data processor.

The DEMUX 310 demultiplexes an input stream. For example, the DEMUX 310 may demultiplex an MPEG-2 TS into a video signal, an audio signal, and a data signal. The stream signal input to the DEMUX 310 may be received from the tuner unit 110, the demodulator 120 or the external device interface 135.

The audio processor 315 may process the demultiplexed audio signal. For audio processing, the audio processor 315 may include various decoders. For efficient transmission of the audio data to the mobile terminal 600, the audio processor 315 may further include an encoder.

In the wireless audio transmission mode of the image display apparatus 100 according to the embodiment of the invention, the audio data transmitted to the mobile terminal 600 may be 1) audio data which is demultiplexed by the DEMUX 310 and is not decoded by the audio processor 315, 2) audio data which is demultiplexed by the DEMUX 310, is decoded by the audio processor 315 and is encoded for transmission to the mobile terminal 600 or 3) audio data which is demultiplexed by the DEMUX 310 and is decoded by the audio processor 315.

In the instance of the audio data of 1), although a time for acquiring the audio data to be transmitted to the mobile terminal 600 is short, since the audio data is not decoded, the mobile terminal 600 which receives the audio data may not decode the audio data if the mobile terminal does not include the decoder.

In the instance of the audio data of 2), since the decoded audio data, that is, the uncompressed audio data, is encoded, it is possible to improve transmission efficiency when wirelessly transmitting the audio data to the mobile terminal 600 and to encode the audio data in consideration of the decoder included in the mobile terminal. However, since the image display apparatus 100 performs demultiplexing, decoding and encoding, it is difficult to perform synchronization between the image display apparatus and the mobile terminal.

In the instance of the audio of 3), since the demultiplexed audio data is decoded, the mobile terminal 600 may receive the uncompressed audio data. Accordingly, the mobile terminal 600 may immediately play back the audio data without performing a separate decoding step. Upon wireless transmission between the image display apparatus 100 and the mobile terminal 600, the amount of wireless data to be transmitted is increased and thus a wide frequency bandwidth is necessary for a wireless channel.

In the embodiment of the invention, any one of the audio data of 1) to 3) is adaptively transmitted according to a wireless channel environment or playback delay information of the mobile terminal, which will be described with reference to FIG. 20 and subsequent figures thereof.

The audio processor 315 may also adjust the bass, treble or volume of the audio signal.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The processor 330 may control the overall operation of the image display apparatus 100 or the controller 170. For example, the processor 330 controls the tuner unit 110 to tune to an RF signal corresponding to a channel selected by the user or a previously stored channel.

The processor 330 may control the image display apparatus 100 by a user command input through the user input interface 150 or an internal program.

The processor 330 may control data transmission of the network interface 135 or the external device interface 130.

The processor 330 may control the operation of the DEMUX 310, the video processor 320 and the OSD generator 340 of the controller 170.

The OSD generator 340 generates an OSD signal autonomously or according to user input. For example, the OSD generator 340 may generate signals by which a variety of information is displayed as graphics or text on the display 180, according to user input signals. The OSD signal may include various data such as a User Interface (UI), a variety of menus, widgets, icons, etc. Also, the OSD signal may include a 2D object and/or a 3D object.

The OSD generator 340 may generate a pointer which can be displayed on the display according to a pointing device received from the remote controller 200. In particular, such a pointer may be generated by a pointing signal processor and the OSD generator 340 may include such a pointing signal processor. Alternatively, the pointing signal processor may be provided separately from the OSD generator 340.

The mixer 345 may mix the decoded video signal processed by the video processor 320 with the OSD signal generated by the OSD generator 340.

The data processor of the controller 170 may process the demultiplexed data signal. For example, if the demultiplexed data signal was encoded, the data processor may decode the data signal. The encoded data signal may be Electronic Program Guide (EPG) information including broadcasting information such as the start time and end time of broadcast programs of each channel.

The block diagram of the controller 170 shown in FIG. 4 is by example. The components of the block diagrams may be integrated or omitted, or a new component may be added according to the specifications of the controller 170.

Figure 5:
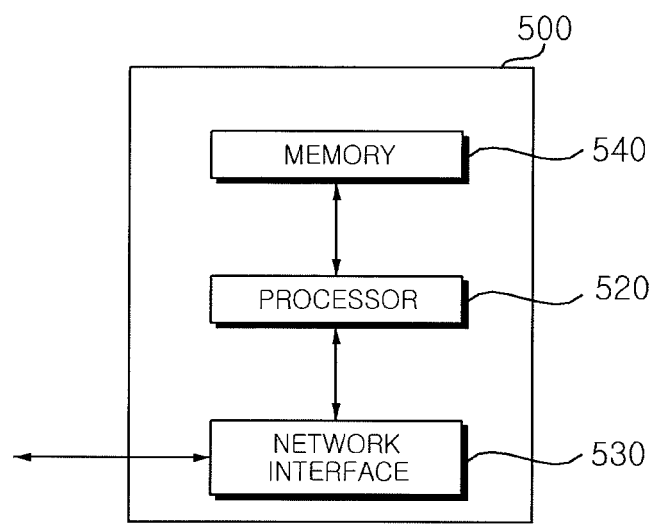
FIG. 5 is a block diagram showing the internal configuration of a wireless router of FIG. 1.

FIG. 5 is a block diagram showing the internal configuration of the wireless router of FIG. 1.

Referring to FIG. 5, the network router 500 may include a network interface 530, a memory 540 and a processor 520.

The network interface 530 may exchange data with the image display apparatus 100 or the mobile terminal 600.

More specifically, in a wireless audio transmission mode, for synchronization with the mobile terminal 600, the network interface 530 may receive TCP packet based control data from the mobile terminal 600, transmit the TCP packet based control data to the image display apparatus 100, receive TCP packet based feedback data from the image display apparatus 100 and transmit the TCP packet based feedback data to the mobile terminal 600.

Next, if synchronization is completed, the network interface 530 may receive RTP/UDP packet based audio data from the image display apparatus 100 and transmit RTP/UDP packet based audio data to the mobile terminal 600, for wireless audio data transmission to the mobile terminal 600.

The memory 540 may store an external IP address and internally allocated virtual IP addresses for providing a wireless network and wireless channel names, frequency ranges and security information corresponding to the virtual IP addresses. The memory 540 may store the name of the image display apparatus 100 and the name of the mobile terminal 600 connected to the network via the network router 500.

The processor 520 controls the overall operation of the network router 500.

As described above, for wireless audio transmission/reception mode, the processor may control data exchange between the image display apparatus 100 and the mobile terminal 600. If an electronic apparatus is added to the network, the processor may additionally allocate a virtual IP address and a wireless channel to the electronic apparatus. The processor may provide wireless channel environment information to the image display apparatus 100 and the mobile terminal 600. For example, the processor may provide security information, channel name information, signal intensity information, etc., of the wireless channel.

Figure 6:
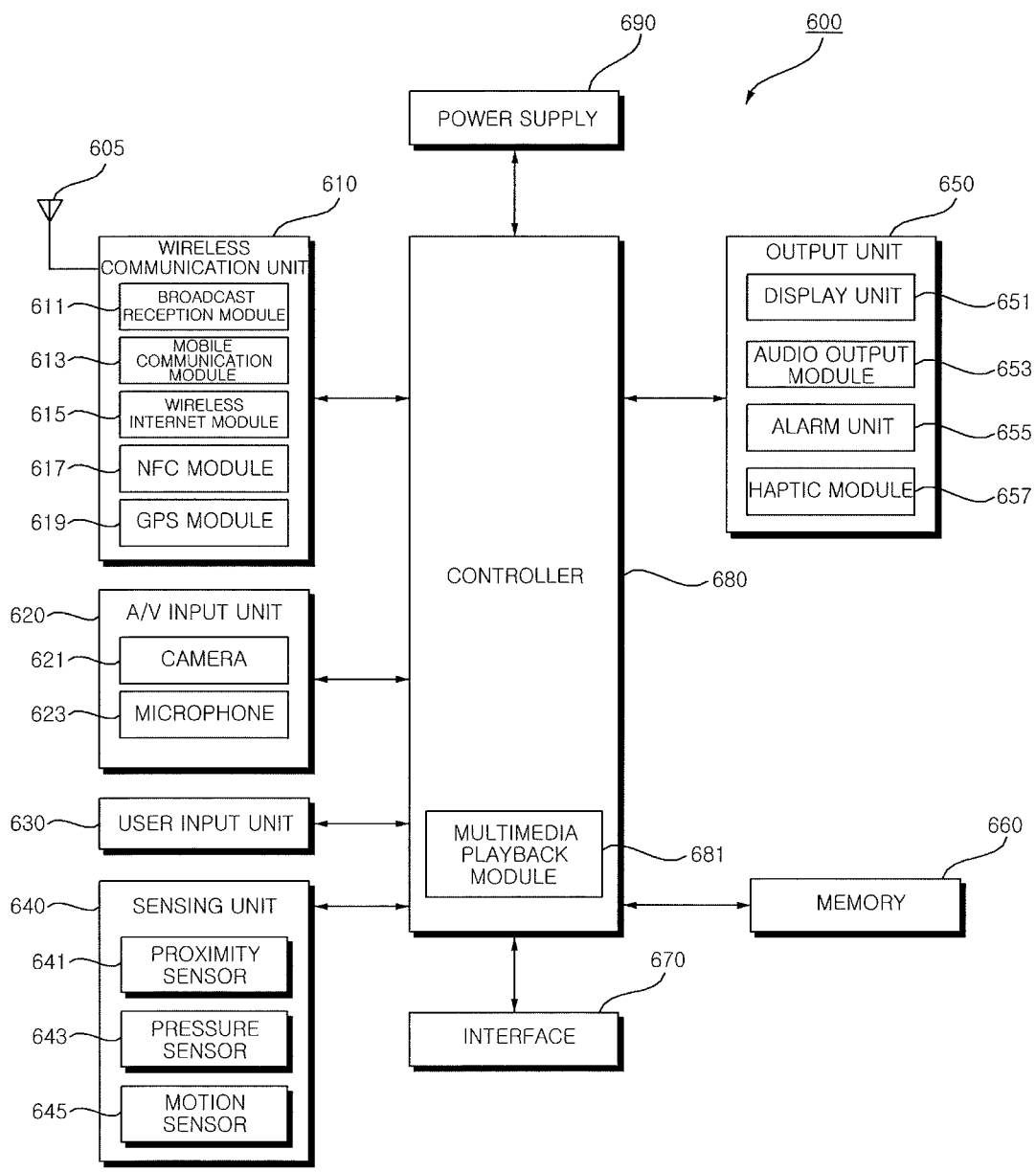
FIG. 6 is a block diagram showing the internal configuration of a mobile terminal of FIG. 1.

FIG. 6 is a block diagram showing the internal configuration of the mobile terminal of FIG. 1.

Referring to FIG. 6, the mobile terminal 600 may include a wireless communication unit 610, an audio/video (A/V) input unit 620, a user input unit 630, a sensing unit 640, an output unit 650, a memory unit 660, an interface unit 670, a controller 680 and a power supply 690.

The wireless communication unit 610 according to the embodiment of the invention may transmit TCP packet based control data to the image display apparatus 100 via the wireless router 500 and receive TCP packet based feedback data from the image display apparatus 100 via the wireless router 500, for synchronization with the image display apparatus 100 in a wireless audio reception mode.

The wireless communication unit 610 may receive RTP/UDP packet based audio data from the image display apparatus 100 via the wireless router 500, for a wireless audio reception mode if synchronization is completed.

The wireless communication unit 610 may include a broadcast reception module 611, a mobile communication module 613, a wireless Internet module 615, an NFC module 617, and a global positioning system (GPS) module 619.

The broadcast reception module 611 receives at least one of a broadcast signal and broadcast-related information from an external broadcast management server through a broadcast channel. The broadcast channel may include a satellite channel and a terrestrial channel.

The broadcast signal and/or the broadcast-related information received through the broadcast reception module 611 may be stored in the memory 660.

The mobile communication module 613 transmits or receives a wireless signal to or from at least one of a base station, an external terminal and a server over a mobile communication network. The wireless signal may include a voice call signal, a video call signal or various types of data associated with transmission and reception of a text/multimedia message.

The wireless Internet module 615 is an internal or external module for wireless Internet access which may be provided to the mobile terminal 600. For example, the wireless Internet module 615 may perform WiFi based wireless communication or WiFi Direct based wireless communication.

The NFC module 617 may perform NFC. The NFC module 617 may receive or transmit data from or to an electronic apparatus including an NFC tag or an NFC module mounted therein if the electronic apparatus approaches the mobile terminal 600 within a predetermined distance, that is, if the electronic device is tagged.

As short-range wireless communication technology, Bluetooth, Radio-Frequency IDentification (RFID), Infrared Data Association (IrDA), Ultra WideBand (UWB), and ZigBee may be used.

The GPS module 619 may receive position information from a plurality of GPS satellites.

The A/V input unit 610 receives an audio signal or a video signal and may include a camera 621 and a microphone 623.

The user input unit 630 generates key input data enabling the user to control the operation of the terminal. The user input unit 630 may include a keypad, a dome switch, a touchpad (static pressure/static electrical), etc. In particular, if the touchpad and the display 651 have a layered structure, it may be called a touchscreen.

The sensing unit 640 detects a current state of the mobile terminal 600 such as whether the mobile terminal 600 is opened or closed, the position of the mobile terminal 600 and contact/non-contact thereof by a user and generates a sensing signal for controlling the operation of the mobile terminal 600.

The sensing unit 640 may include a proximity sensor 641, a pressure sensor 643 and a motion sensor 645. The motion sensor 645 may sense motion or position of the mobile terminal 600 using an acceleration sensor, a gyroscopic sensor and a gravity sensor. In particular, the gyroscopic sensor measures an angular speed and senses a direction (angle) in which the mobile terminal rotates from a reference direction.

The output unit 650 may include a display 651, an audio output module 653, an alarm unit 655 and a haptic module 657.

The display 651 displays information processed by the mobile terminal 600.

As described above, if the display 651 and the touchpad have the layered structure to configure the touchscreen, the display 651 can be used not only as an output device but also as an input device for inputting information via user touch.

The audio output module 653 may output audio data received from the wireless communication module 610 or stored in the memory 660. The audio output module 653 may include a speaker, a buzzer, etc.

The alarm unit 655 outputs a signal notifying the user that an event has occurred in the mobile terminal 600.

The haptic module 657 generates a variety of tactile effects that the user can feel. A typical example of the tactile effect generated by the haptic module 657 is vibration.

The memory 660 may store a program for processing and control of the controller 680 and may temporarily store input or output data (for example, a phonebook, messages, audio, still images, and moving images).

The interface 670 serves as an interface with all external devices connected to the mobile terminal 600. The interface 670 may receive data from an external device or receive power and transmit power to the components of the mobile terminal 600 or transmit data of the mobile terminal 600 to an external device.

The controller 680 controls the overall operation of the mobile terminal 600. For example, the controller 680 performs control and processing associated with voice communication, data communication, video communication, and the like. The controller 680 may include a multimedia playback module 681 for multimedia playback. The multimedia playback module 681 may be implemented in the controller 680 in hardware form or may be implemented in software form separately from the controller 680. The operation of the controller 680 for multimedia playback will be described below with reference to FIG. 11 and subsequent figures thereof.

The power supply 690 receives external power or internal power and supplies power required for operation to each component under control of the controller 680.

The block diagram of the mobile terminal 600 shown in FIG. 6 is only by example. Depending upon the specifications of the mobile terminal 600 in actual implementation, the components of the mobile terminal 600 may be combined or omitted or new components may be added. That is, two or more components may be incorporated into one component or one component may be configured as separate components, as needed. In addition, the function of each block is described for the purpose of describing the embodiment of the invention and thus specific operations or devices should not be construed as limiting the scope and spirit of the invention.

Figure 7:
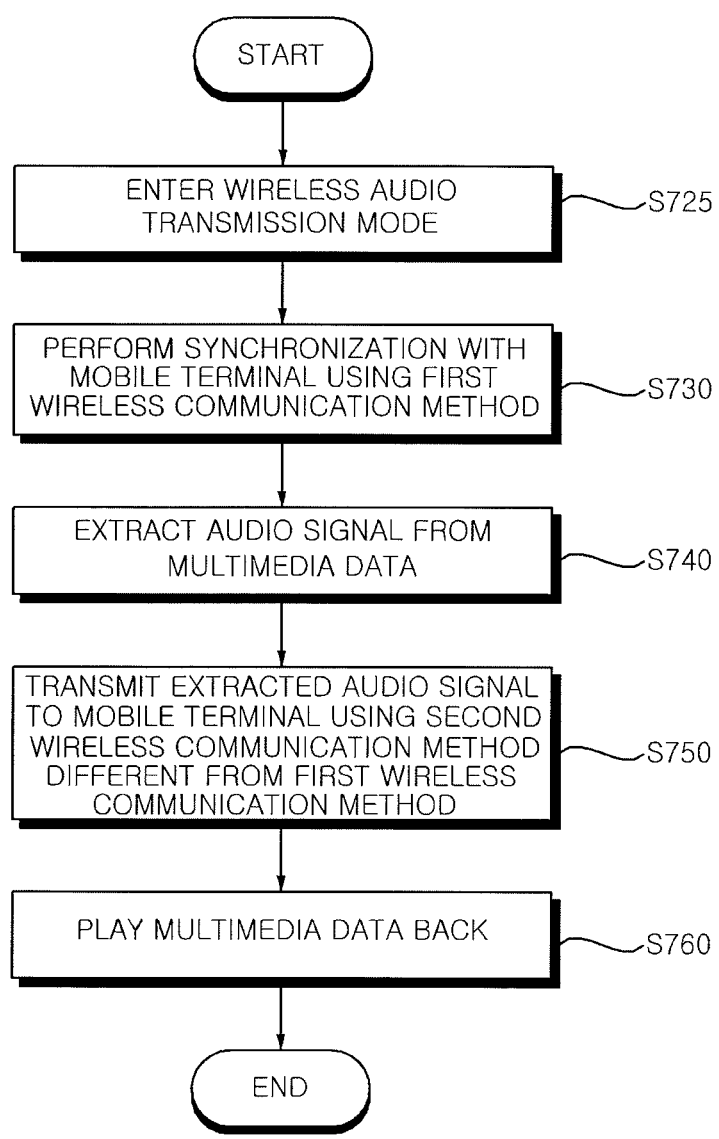
FIG. 7 is a flowchart illustrating a method for operating an image display apparatus according to an embodiment of the invention.

FIG. 7 is a flowchart illustrating a method for operating an image display apparatus according to an embodiment of the invention.

Referring to FIG. 7, first, the image display apparatus 100 enters a wireless audio transmission mode when receiving a wireless audio reception mode entrance signal from the mobile terminal (S725). Then, synchronization with the mobile terminal 600 is performed using a first wireless communication method (S730).

The network interface 135 of the image display apparatus 100 may receive a TCP packet including a wireless audio transmission mode start signal via the wireless router 500. In the embodiment of the invention, in order to secure data communication reliability, a TCP based communication method may be employed as the first wireless communication method.

The controller 170 of the image display apparatus 100 may control entrance into the wireless audio transmission mode if the wireless audio transmission mode start signal in the TCP packet is received. Then, the controller 170 may control the image display apparatus to perform synchronization with the mobile terminal 600.

More specifically, the controller 170 of the image display apparatus 100 may control transmission of information about the number of channels of audio data to be transmitted, encoding state information, encoding scheme information, etc., as feedback data in the form of the TCP packet in correspondence with the received wireless audio transmission mode start signal.

The information about the number of channels indicates information indicating whether the channel of audio data to be transmitted is a mono channel, a stereo channel or a 5.1 channel.

The encoding state information may indicate whether audio data to be transmitted is 1) audio data which is demultiplexed by the DEMUX 310 and is not decoded by the audio processor 315, 2) audio data which is demultiplexed by the DEMUX 310, is decoded by the audio processor 315 and is encoded for transmission to the mobile terminal 600 or 3) audio data which is demultiplexed by the DEMUX 310 and is decoded by the audio processor 315.

The encoding scheme information is valid when the encoding state information indicates encoded audio data and may indicate whether an encoding scheme is an AC3 encoding scheme or an AAC encoding scheme.

For example, if the image display apparatus 100 receives the wireless audio transmission mode start signal in a state of playing back a broadcast image of a specific channel as multimedia data, the controller 170 of the image display apparatus 100 controls transmission of AAC as encoding scheme information if the encoding scheme of audio data to be transmitted is an AAC encoding scheme and controls transmission of a stereo channel as information about the number of channels if the number of channels is 2.

Next, the network interface 135 of the image display apparatus 100 may receive a TCP packet including synchronization completion information indicating that synchronization with the mobile terminal 600 is completed. Then, synchronization between the image display apparatus 100 and the mobile terminal 600 is completed. That is, preparation for audio data transmission is completed in the wireless audio transmission mode.

Next, the image display apparatus 100 extracts an audio signal from multimedia data (S740). The extracted audio signal is transmitted to the mobile terminal using a second communication method (S750).

After synchronization is completed, the controller 170 of the image display apparatus 100 extracts an audio signal to be transmitted. For example, if the multimedia data is a broadcast signal, the controller 170 and, more particularly, the DEMUX 310 of the image display apparatus may demultiplex a broadcast stream into an audio signal, a video signal and a data signal.

In the wireless audio transmission mode according to the embodiment of the invention, the audio data transmitted to the mobile terminal 600 may be 1) audio data which is demultiplexed by the DEMUX 310 and is not decoded by the audio processor 315, 2) audio data which is demultiplexed by the DEMUX 310, is decoded by the audio processor 315 and is encoded for transmission to the mobile terminal 600 or 3) audio data which is demultiplexed by the DEMUX 310 and is decoded by the audio processor 315.

The controller 170 of the image display apparatus 100 may control selection of any one of the audio signal of 1) to 3) and transmission of the selected audio signal to the mobile terminal 600 in the form of a one-way multicast RTP/UDP packet.

In the embodiment of the invention, for low-delay streaming of audio data and multi-user support, a real time transmission protocol (RTP)/user datagram protocol (UDP) based communication method may be employed as the second wireless communication method.

Next, the image display apparatus 100 plays back the multimedia data (S760). In particular, the controller 170 of the image display apparatus 100 may decode the video signal among the demultiplexed audio signal, video signal and data signals and output the video signal to be displayed on the display 180. Then, the display 180 may display the broadcast image corresponding to the received broadcast signal. At this time, the audio output unit 185 of the image display apparatus 100 may not output a broadcast audio signal corresponding to the received broadcast signal. That is, the audio output unit 185 of the image display apparatus is in a mute mode and thus may not output an audio signal. Thus, other users who do not wish to listen to the audio data need not listen to the audio signal when the image display apparatus 100 plays back the multimedia data.

Figure 8:
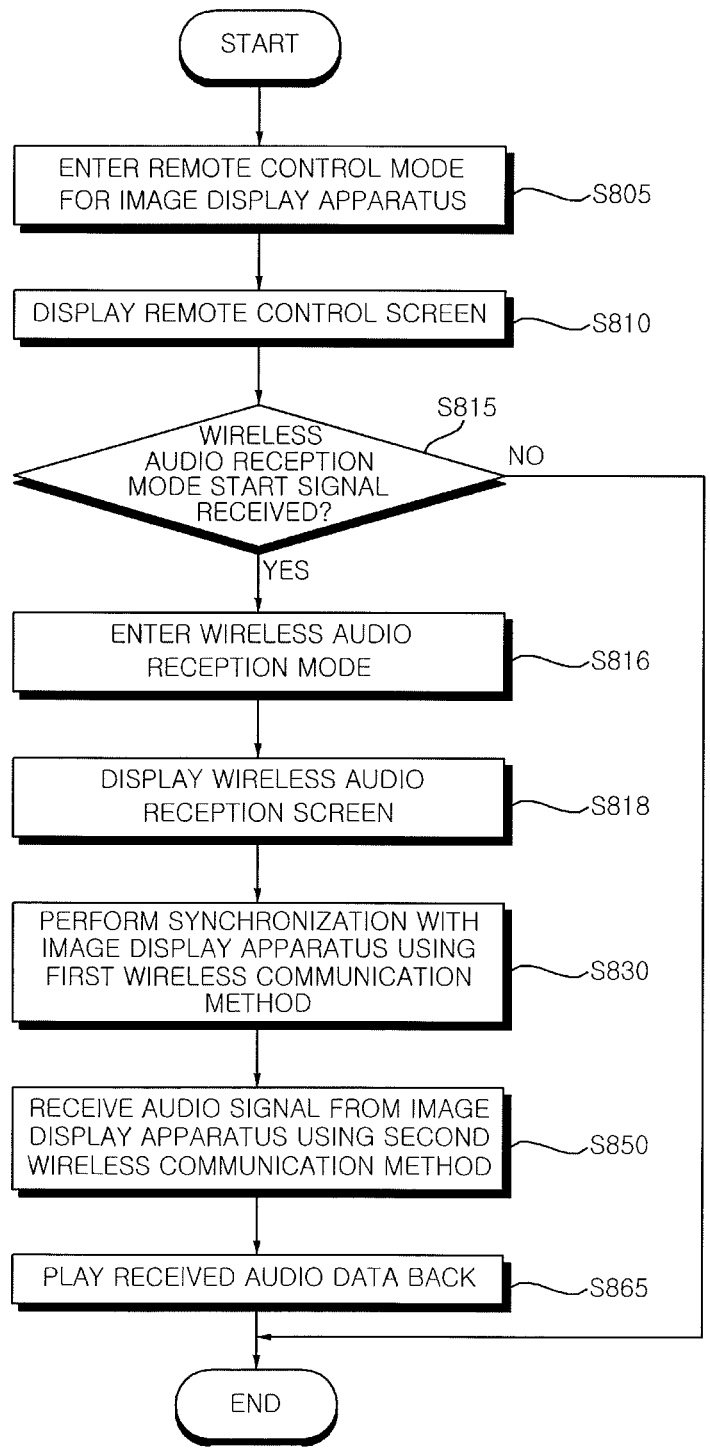
FIG. 8 is a flowchart illustrating a method for operating a mobile terminal according to an embodiment of the invention.

FIG. 8 is a flowchart illustrating a method for operating a mobile terminal according to an embodiment of the invention.

Referring to FIG. 8, first, the mobile terminal 600 enters a remote control mode for the image display apparatus (S805) and displays a remote control screen (S810). In a state of displaying the remote control screen, it is determined whether a wireless audio reception mode start signal is received (S815) and, if so, the mobile terminal enters the wireless audio reception mode (S816). Then, a wireless audio reception screen is displayed (S818) and synchronization with the image display apparatus is performed using the first wireless communication method (S820).

If a remote control menu item or a remote control application item of the mobile terminal 600 is executed, the controller 680 of the mobile terminal 600 may control entrance of the image display apparatus 100 into the remote control mode. The controller 680 of the mobile terminal 600 may control display of the remote control screen 1310 shown in (a) of FIG. 13 on the display 651.

Figure 13:
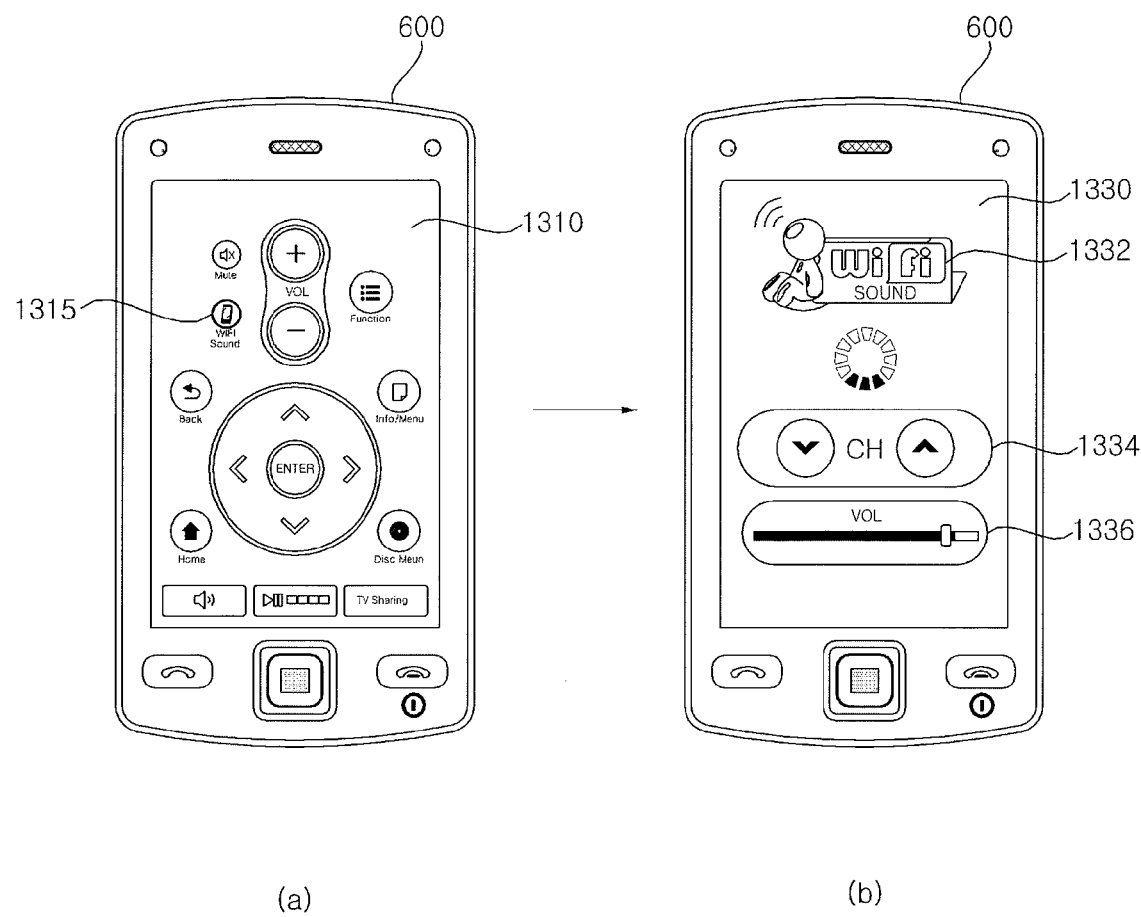

The remote control screen 1310 of (a) of FIG. 13 includes a mute item, a channel control item, a volume control item, a wireless audio reception mode item (WiFi sound) 1315. If a user selects the wireless audio reception mode item (WiFi sound) 1315, the controller 680 of the mobile terminal 600 may determine that the wireless audio reception mode is selected and control display of the wireless audio reception screen indicating the wireless audio reception mode.

(b) of FIG. 13 shows the wireless audio reception screen. A WiFi sound screen 1330 indicating the wireless audio reception mode is displayed on the display 651.

The WiFi sound screen 1330 of (b) of FIG. 13 includes an object (denoted by WiFi sound) 1332 indicating the wireless audio reception mode, a channel control item 1334 and a volume control item 1336.

If the wireless audio reception mode item (WiFi sound) 1315 of the remote control screen 1310 is selected, the controller 680 of the mobile terminal 600 may control transmission of a TCP packet including a wireless audio reception mode start signal to the image display apparatus 100, separately from control of display of the WiFi sound screen 1330, as shown in (b) of FIG. 13. That is, the controller 680 may control synchronization with the image display apparatus 100.

The image display apparatus 100 enters the wireless audio reception mode and performs synchronization with the mobile terminal. That is, the image display apparatus 100 may transmit information about the number of channels of audio data to be transmitted, encoding state information, encoding scheme information, etc., as feedback data in the form of a TCP packet. The controller 680 of the mobile terminal 600 may receive information about the number of channels, encoding state information, encoding scheme information, etc., via the wireless communication unit 610.

The controller 680 of the mobile terminal 600 may control transmission of a TCP packet including synchronization completion information indicating that synchronization with the image display apparatus 100 is completed, if synchronization with the image display apparatus 100 is completed.

Next, the mobile terminal 600 receives an audio signal from the image display apparatus using the second wireless communication method (S850). After synchronization is completed, the image display apparatus 100 may transmit audio data in the form of an RTP/UDP packet and the controller 680 of the mobile terminal 600 receives audio data. The audio data may be 1) non-encoded audio data, 2) encoded audio data or 3) multiplexed and encoded audio data.

Next, the mobile terminal 600 plays back the received audio data (S865). In particular, the controller 680 of the mobile terminal 600 plays back the audio data and outputs the played audio data via the audio output module 653, in correspondence with any one of the audio data of 1) to 3).

The user of the mobile terminal 600 may listen to the audio signal output from the mobile terminal 600 while viewing the video of the multimedia data played back by the image display apparatus 100.

Unlike FIG. 8, even when the remote control screen is not displayed on the mobile terminal 600, the mobile terminal may immediately enter the wireless audio reception mode. For example, the mobile terminal may immediately enter the wireless audio reception mode if a hot key indicating a wireless audio reception mode is manipulated or a wireless audio reception mode app is executed. By manipulation of the hot key or the execution of the app, without displaying the remote control screen, the WiFi sound screen 1330 shown in (b) of FIG. 13 may be immediately displayed on the mobile terminal 600.

Figure 9:
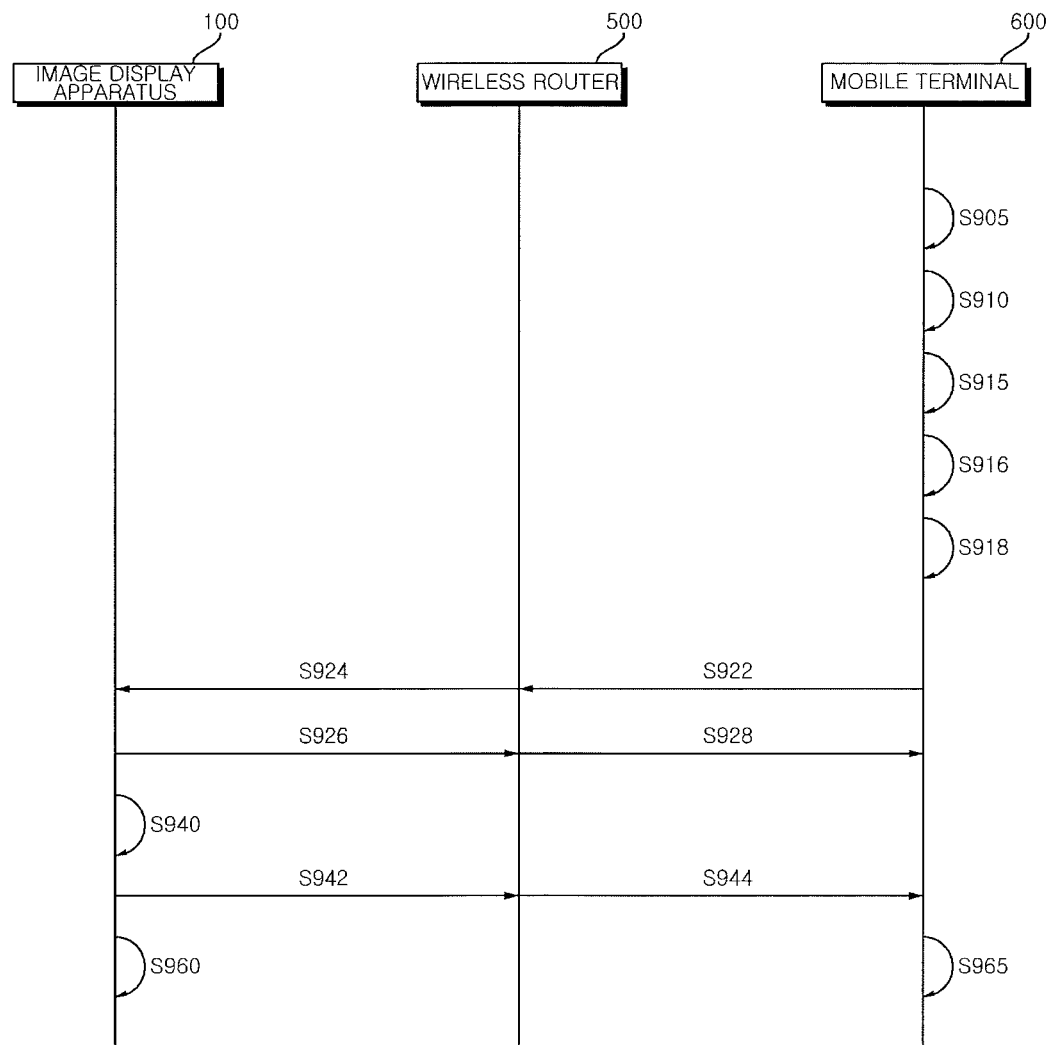
FIG. 9 is a flowchart illustrating an operation of an image display system according to an embodiment of the invention.

FIG. 9 is a flowchart illustrating an operation of an image display system according to an embodiment of the invention.

The operation of the image display system of FIG. 9 corresponds to FIGS. 7 and 8.

More specifically, operations S905 to S918 (S905, S910, S915, S916 and S918) correspond to operations S805 to S818 (S805, S810, S815, S816 and S818) of FIG. 8 and operations S922 to S928 (S922, S924, S926 and S928) correspond to operation S830 of FIG. 8 and operation S730 of FIG. 7.

Step S940 corresponds to operation S740 of FIG. 7 and operations S942 to S944 (S942 and S944) correspond to operation S750 of FIG. 7 and operation S850 of FIG. 8.

Step S960 corresponds to operation S760 of FIG. 7 and operation S965 corresponds to operation S865 of FIG. 8.

Figure 10:
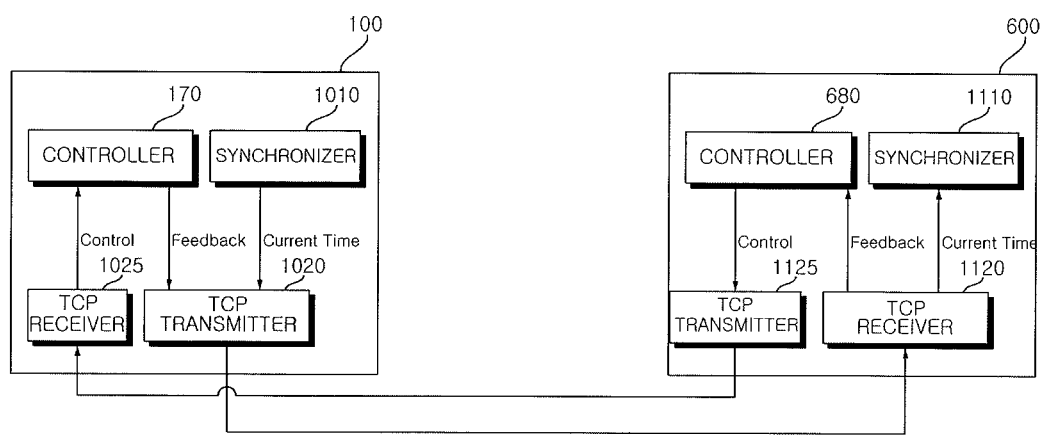
FIGS. 10 to 14 are views referred to for describing various examples of the method for operating the image display apparatus of FIG. 7 or the method for operating the mobile terminal of FIG. 8.

FIG. 10 is a view referred to for describing TCP packet data exchange between the image display apparatus and the mobile terminal.

The controller 680 of the mobile terminal 600 may control transmission of control data via a TCP transmitter 1125. Control data may include at least one of wireless audio reception mode start information or end information, wireless channel setting request information, allocated wireless channel information, decoding information, wireless channel environment information or playback delay information.

Among such control data, during a synchronization process, wireless audio reception mode start information, wireless channel setting request information, allocated wireless channel information, decoding information, etc. may be transmitted to the image display apparatus 100.

Among such control data, during an audio data reception process, wireless audio reception mode end information, wireless channel change request information, wireless channel environment information, playback delay information, etc., may be transmitted to the image display apparatus 100.

The controller 170 of the image display apparatus 100 may receive control data via a TCP receiver 1025. The controller 170 may control transmission of feedback data via the TCP transmitter 1020. Feedback data may include at least one of information about the number of channels of audio data to be transmitted, encoding state information, encoding scheme information, playback point-of-time information, current time information, etc.

Among such control data, during a synchronization process, information about the number of channels of audio data to be transmitted, encoding state information, encoding scheme information, etc., may be transmitted to the mobile terminal 600.

Among such control data, during an audio data transmission process, playback point-of-time information, etc., of audio data to be transmitted may be transmitted to the mobile terminal 600.

In FIG. 10, a synchronizer 1010 of the image display apparatus 100 is provided separately from the controller 170 such that current time information is transmitted to the mobile terminal 600 via a TCP transmitter 1020 separately from feedback data. A synchronizer 1110 of the mobile terminal 600 is provided separately from the controller 680 such that current time information is received via a TCP receiver 1120 together with feedback data.

The current time information may be transmitted in a state of being included in feedback data.

The TCP receiver 1025 and the TCP transmitter 1020 of the image display apparatus 100 may be included in the network interface 135 of FIG. 3. The TCP receiver 1120 and the TCP transmitter 1125 of the mobile terminal 600 may be included in the wireless communication unit 610 of FIG. 6.

Figure 11:
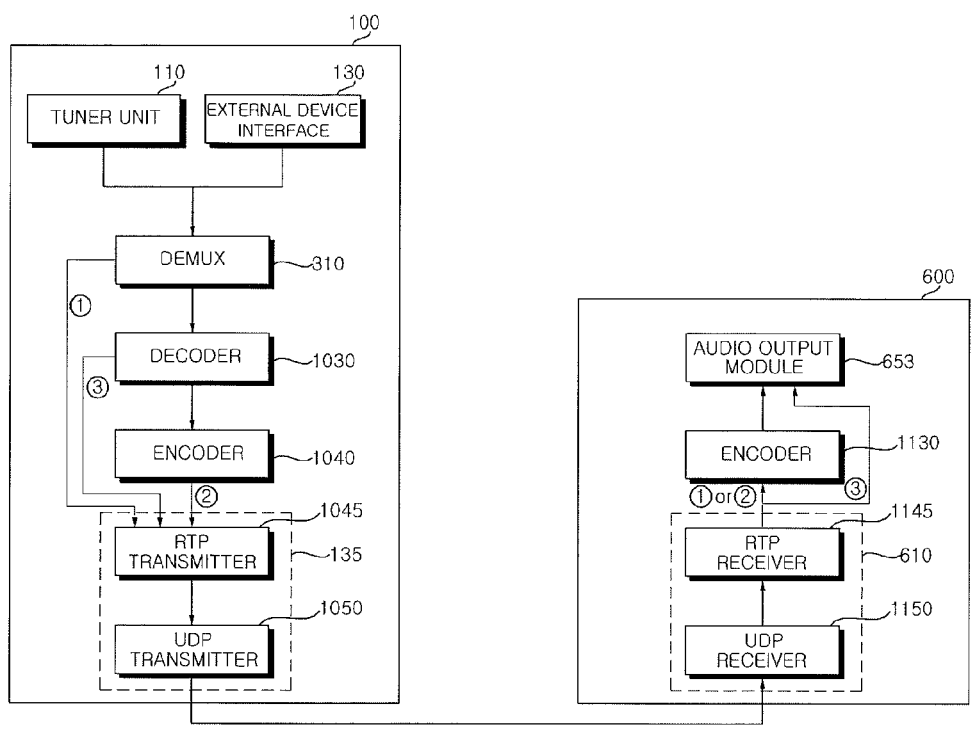
Figure 12:
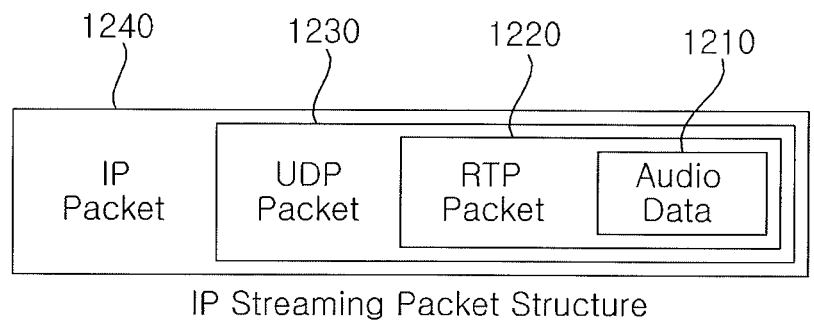

FIG. 11 is a view referred to for describing RTP/UDP packet data exchange between the image display apparatus and the mobile terminal and FIG. 12 schematically shows the structure of RTP/UDP packet data.

The image display apparatus 100 may receive multimedia data from the tuner unit 110, the external device interface 130 or the network interface 135.

In the case of stream data, the DEMUX 310 demultiplexes stream data, a decoder 1030 decodes audio data, and an encoder 1040 encodes the decoded audio data. The DEMUX 310, the decoder 1030 and the encoder 1040 may be included in the controller 170.

Audio data transmittable to the mobile terminal 600 may be ① audio data which is demultiplexed by the DEMUX 310 and is not decoded by the decoder 1030, ② audio data which is demultiplexed by the DEMUX 310, is decoded by the decoder 1030 and is encoded by the encoder 1040 or ③ audio data which is demultiplexed by the DEMUX 310 and is decoded by the decoder 1030.

As shown in FIG. 12, audio data 1210 to be transmitted may be attached with an RTP packet 1220 by an RTP transmitter 1045 of the image display apparatus 100, may be attached with a UDP packet 1230 by a UDP transmitter 1050, and may be transmitted to the mobile terminal 600 as an IP packet 1240.

A UDP receiver 1150 of the mobile terminal 600 separates the UDP packet 1230, the RTP receiver 1145 separates the RTP packet 1220 and supplies the audio data 1210 to an encoder 1130 or an audio output module 653 (more accurately, an audio playback buffer).

If audio data transmitted by the image display apparatus 100 is audio data of ① or ②, since the audio data was encoded, the audio data is decoded by the decoder 1130 and is provided to the audio output module 653.

As another example, if audio data transmitted by the image display apparatus 100 is audio data of ③, since the audio data was decoded, the audio data is provided to the audio output module 653 without being decoded.

The RTP transmitter 1045 and the UDP transmitter 1050 of the image display apparatus 100 may be included in the network interface 135 of FIG. 3. The UDP receiver 1150 and the RTP receiver 1145 of the mobile terminal 600 may be included in the wireless communication unit 610 of FIG. 6.

Figure 14:
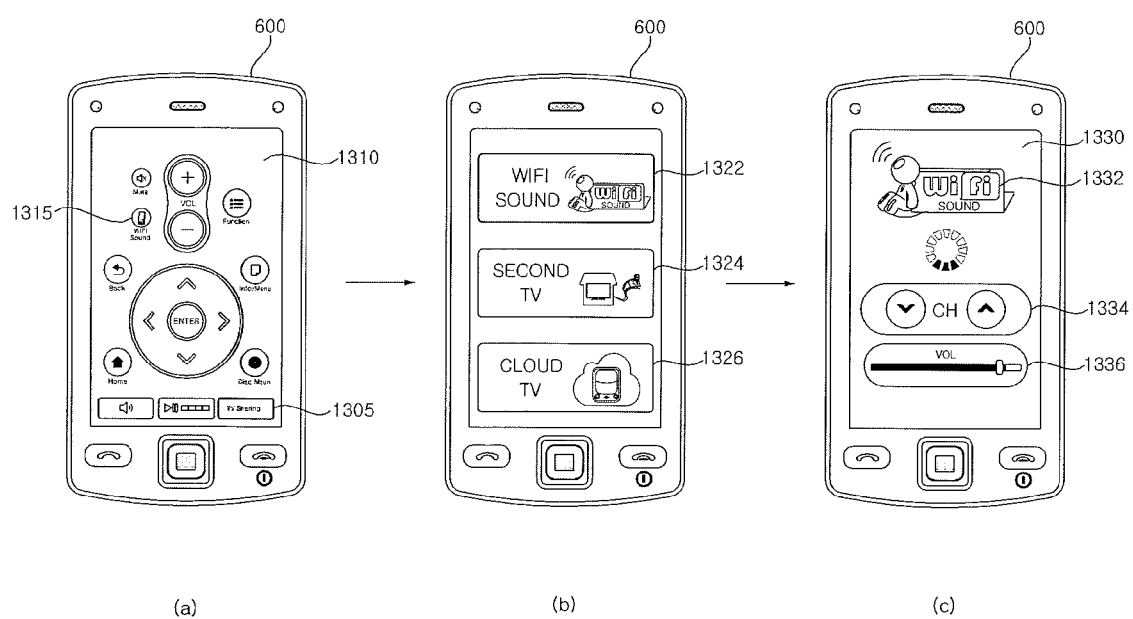

FIG. 14 shows another example of a user interface of the mobile terminal for entering a wireless audio reception mode, similarly to FIG. 13.

Referring to FIG. 14, and unlike FIG. 13, if a "TV sharing" item 1305 of the remote control screen 1310 of (a) of FIG. 14 is selected, as shown in (b) of FIG. 14, a TV sharing screen may be displayed. In FIG. 14, the TV sharing screen includes remote control items such as a WiFi sound item 1322, a second TV item 1324, a cloud TV item 1326, etc.

Among others, if the WiFi sound item 1322 is selected, the controller 680 of the mobile terminal 600 may control display of a WiFi sound screen 1330 as shown (c) of FIG. 14, which shows a wireless audio reception screen similar to that of (b) of FIG. 13. In addition, the controller 680 of the mobile terminal 600 may control transmission of a TCP packet including a wireless audio reception mode start signal to the image display apparatus 100 separately from the WiFi sound screen 1330. That is, the controller 680 may control synchronization with the image display apparatus 100.

FIGS. 15A to 17C are views referred to for describing various examples of the method for operating the mobile terminal of FIG. 8.

Figure 15A:
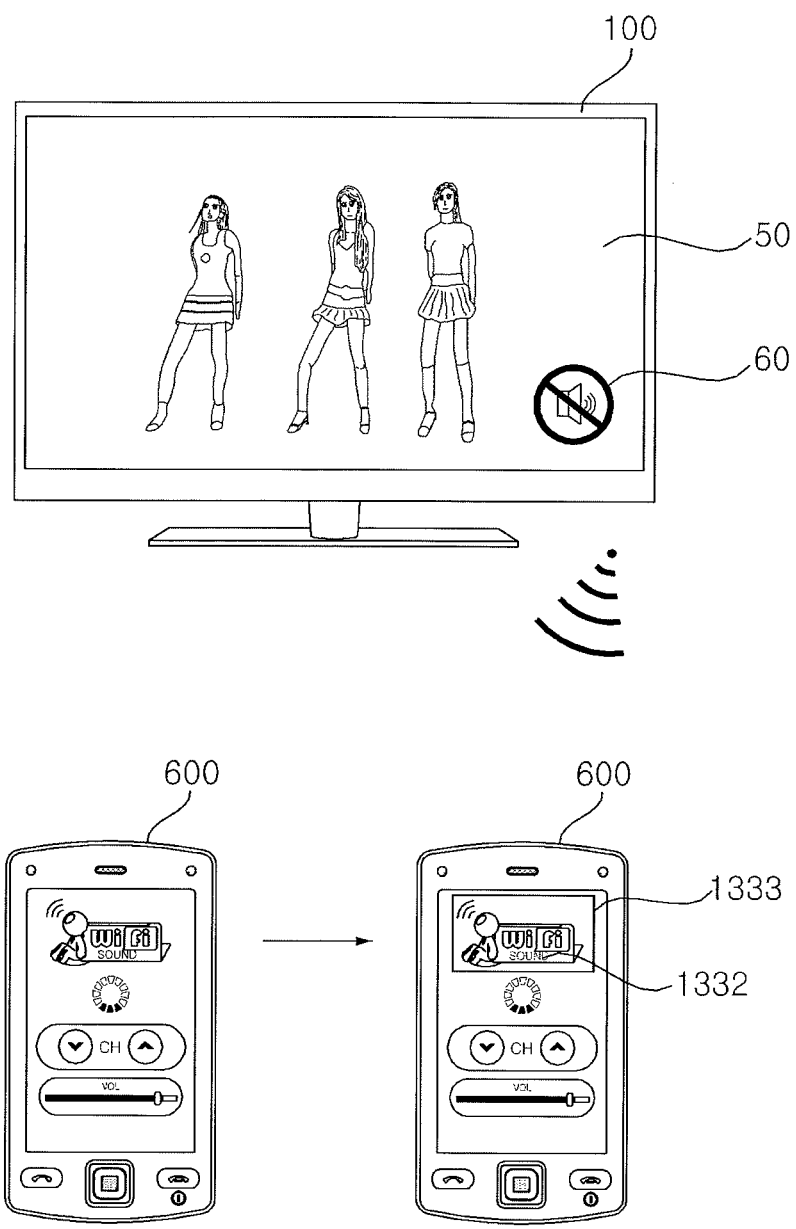
FIGS. 15A to 17C are views referred to for describing various examples of the method for operating the mobile terminal of FIG. 8.

First, FIG. 15A shows display of an object indicating that audio data is received when the audio data is received in a state of displaying a wireless audio reception mode screen.

The image display apparatus 100 may not output audio data while playing back multimedia data, when entering into a wireless audio transmission mode. Thus, as shown, an object 60 indicating a mute mode may be displayed on the display 180.

The mobile terminal 600 may display an object 1333 indicating that audio data is received on the display 651 when the audio data is received in a wireless audio reception mode. A focusing object 1333 is displayed around an object 1332 indicating the wireless audio reception mode.

The object 1333 may not be displayed when audio data is not received and may be displayed only when audio data is received. Thus, the user may visually and conveniently confirm whether audio data is received.

Unlike FIG. 15A, the object 1332 indicating the wireless audio reception mode is focused, moved or highlighted without displaying the focusing object 1333.

Figure 15B:
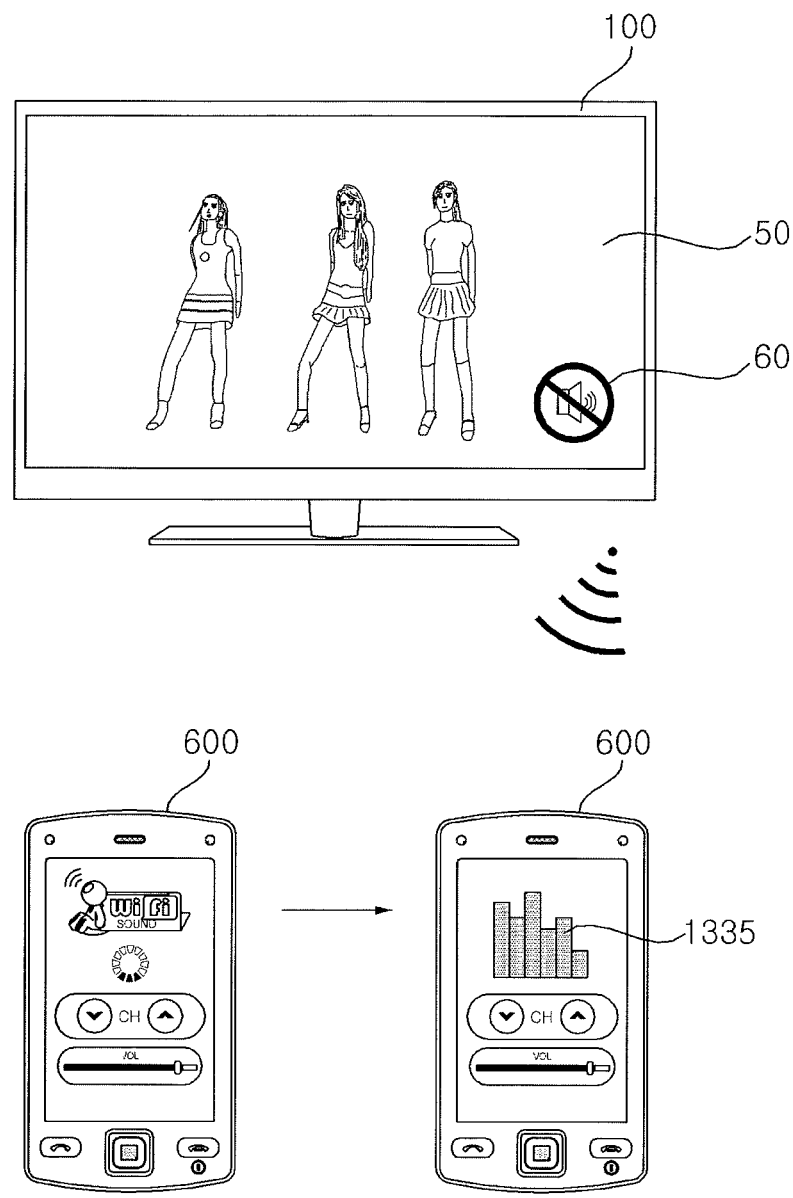

Next, FIG. 15B shows display of an object indicating that audio data is received, similarly to FIG. 15A. FIG. 15B is different from FIG. 15A in the shape of the object.

In FIG. 15B, instead of the object 1332 indicating the wireless audio reception mode, an object 1335 indicating the volume level of the received audio data is displayed. That is, the object 1335 may be displayed as an equalizer object. Accordingly, not only presence/absence of the received audio data but also the volume level can be visually confirmed.

Figure 15C:
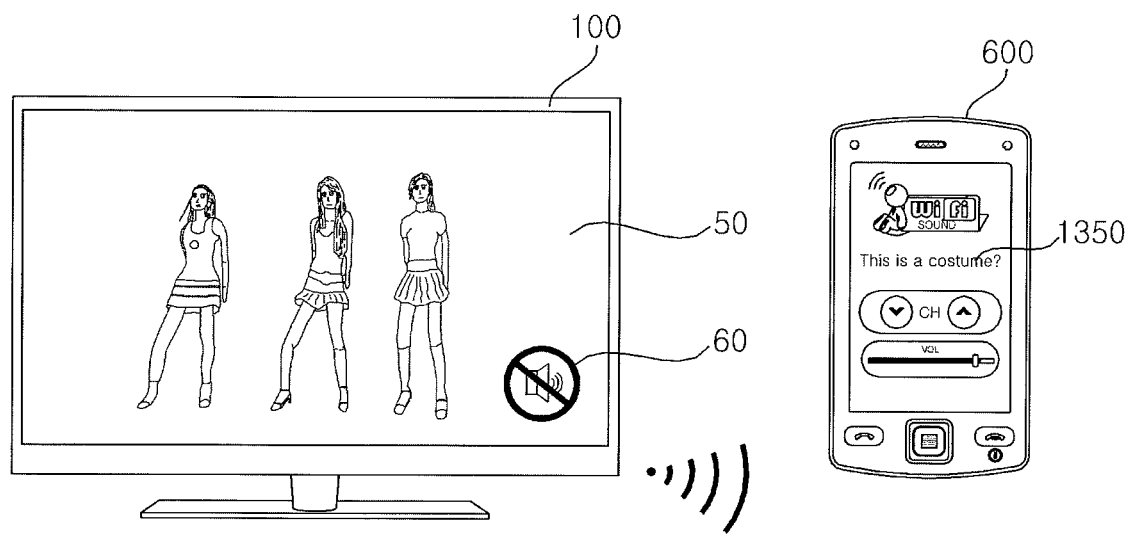

Next, FIG. 15C shows display of text 1350 corresponding to audio data if the audio data is received in a state of displaying a wireless audio reception mode screen 1330.

The controller 680 of the mobile terminal 600 may acquire text corresponding to the received audio data. For example, the controller 680 of the mobile terminal 600 may convert the audio data into text using a voice recognition algorithm. As another example, the controller 680 of the mobile terminal 600 may transmit the received audio data to an external server and receive text corresponding thereto from a server. Accordingly, the user can conveniently confirm desired audio data.

Figure 15D:
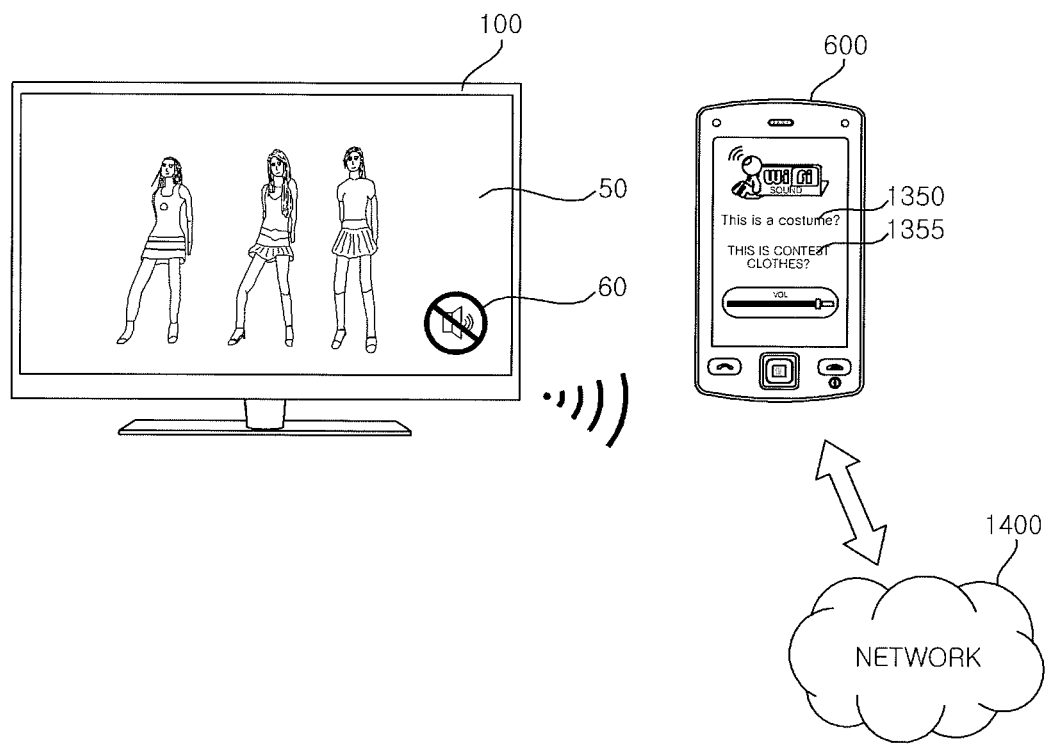

Next, FIG. 15D shows display of text 1350 corresponding to audio data and a subtitle 1355 corresponding to the text if the audio data is received in a state of displaying a wireless audio reception mode screen 1330.

The controller 680 of the mobile terminal 600 may further acquire the subtitle corresponding to the text. For example, the controller 680 of the mobile terminal 600 may acquire a subtitle translated into a predetermined language from the text using a text translation algorithm. As another example, the controller 680 of the mobile terminal 600 may transmit the received audio data or text data to an external server over a network 1400 and receive text or subtitle corresponding thereto from a server over the network 1400. Accordingly, the user can conveniently confirm desired audio data.

Figure 16B:
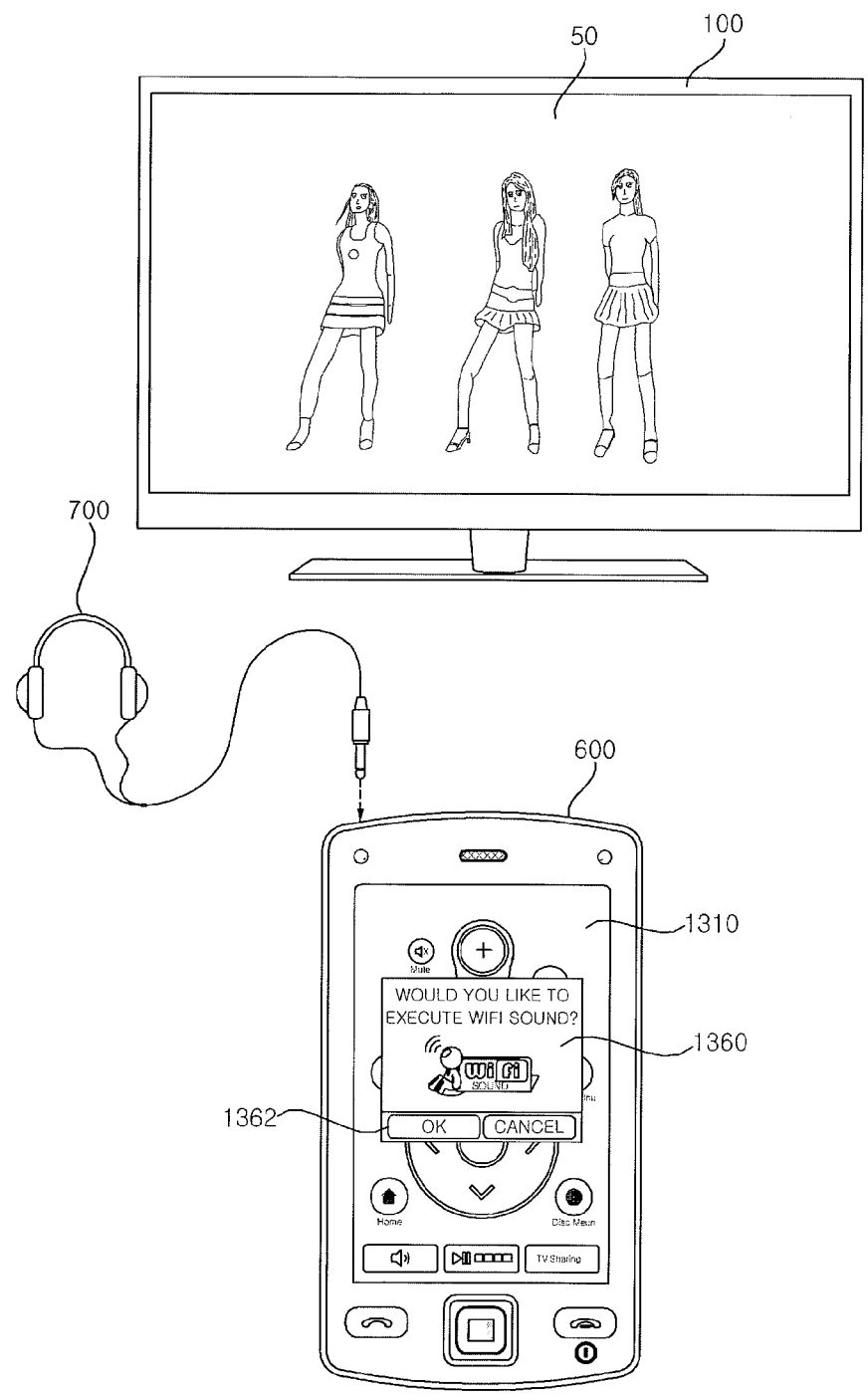

FIGS. 16A to 16C show entrance into a wireless audio reception mode when it is detected that an earphone jack is connected to the mobile terminal 600.

FIG. 16A shows an instance in which the image display apparatus 100 displays a predetermined image 50 and the mobile terminal 600 displays a remote control screen 1310. The audio output unit 185 of the image display apparatus 100 outputs an audio signal corresponding to the displayed image 50.

Next, FIG. 16B shows display of an object 1360 indicating whether the mobile terminal enters a wireless audio reception mode on the display 651 of the mobile terminal 600 if an earphone jack is connected to the mobile terminal 600.

The controller 680 of the mobile terminal 600 detects whether the earphone jack is connected to the mobile terminal 600. For example, the controller 680 of the mobile terminal 600 may detect that current flows in a resistor connected to a connection terminal of the earphone jack if the earphone jack is connected, and determine that the earphone jack is connected.

The controller 680 of the mobile terminal 600 may control display of the object 1360 indicating whether the mobile terminal enters the wireless audio reception mode if the earphone jack is connected to the mobile terminal 600. Such an object 1360 may include a wireless audio reception mode entrance item 1362 and an entrance cancellation item. Accordingly, it is possible to improve user convenience.

The controller 680 of the mobile terminal 600 may control display of a wireless audio reception mode screen 1330 on the display 651 of the mobile terminal 600 as shown in FIG. 16C if the entrance item 1362 is selected. That is, the mobile terminal 600 may enter the wireless audio reception mode. In addition, the image display apparatus 100 may enter the wireless audio transmission mode. Thus, the image display apparatus 100 may not output an audio signal and may display an object 60 indicating a mute mode on the display 180.

Without displaying the object 1360 indicating whether the mobile terminal enters the wireless audio reception mode of FIG. 16B, the screen of FIG. 16A may be directly switched to the screen of FIG. 16C. That is, the controller 680 of the mobile terminal 600 may control immediate display of the wireless audio reception mode screen 1330 on the display 651 of the mobile terminal 600 if the earphone jack is connected to the mobile terminal 600. Accordingly, it is possible to improve user convenience.

Figure 17A:
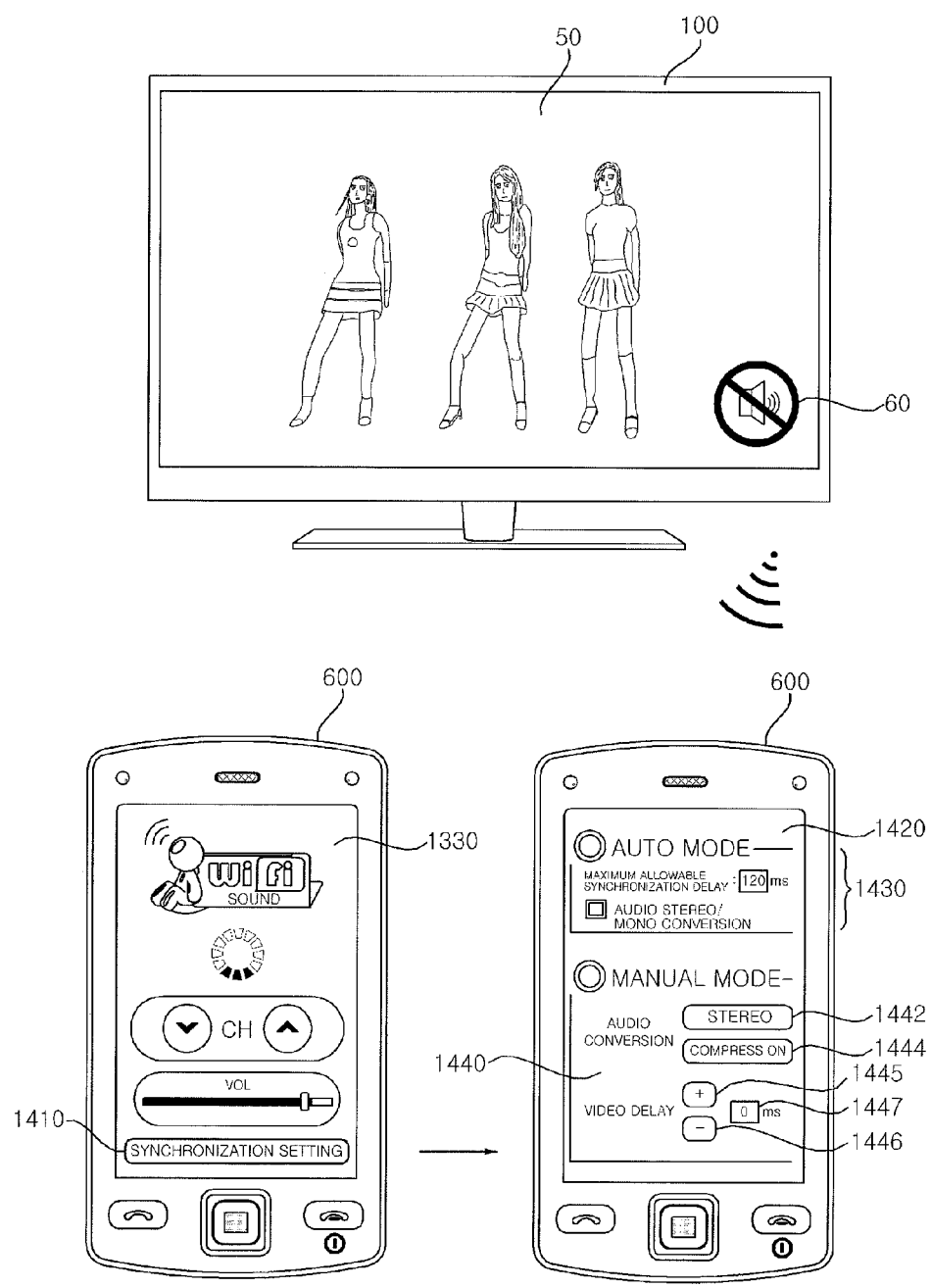
Figure 17B:
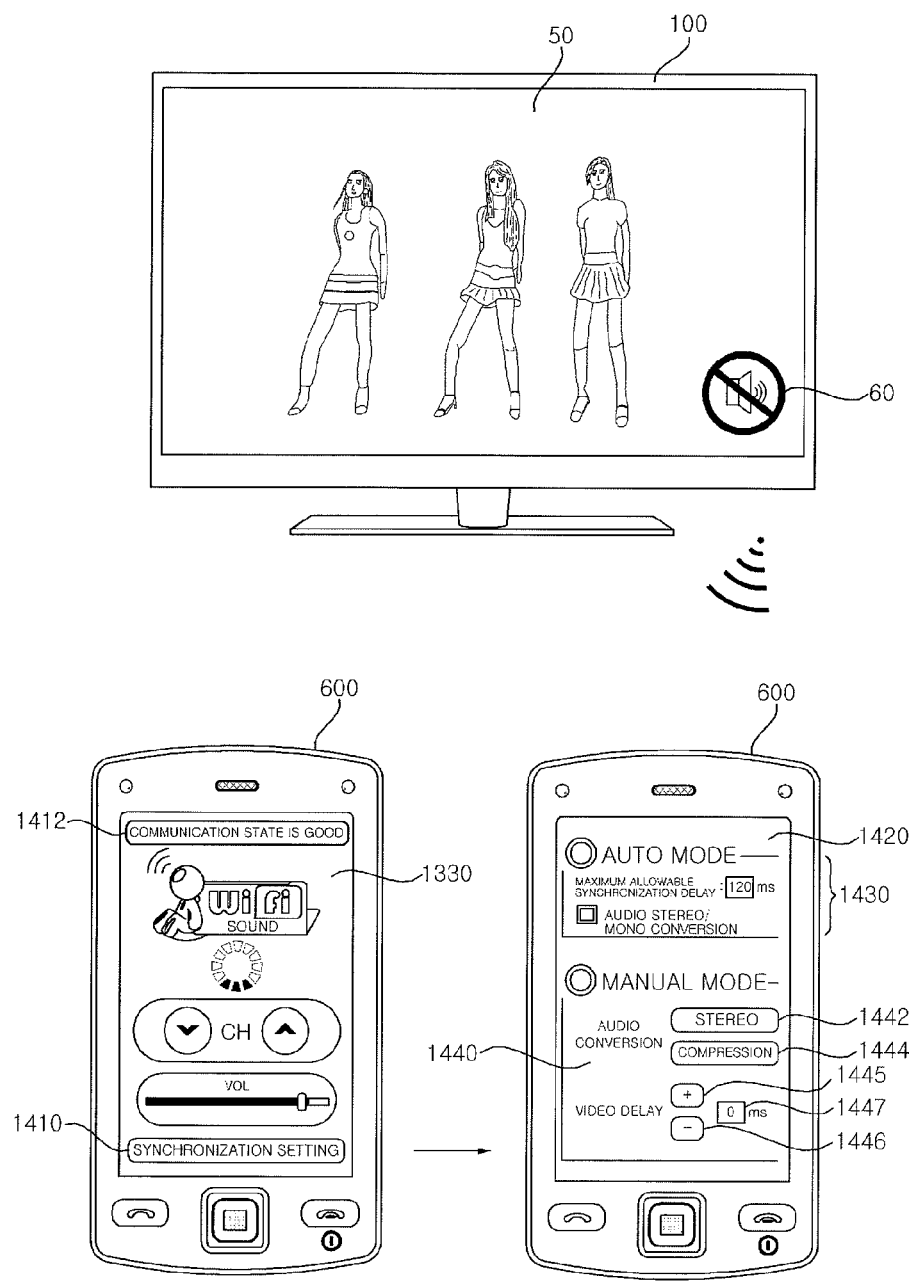
Figure 17C:
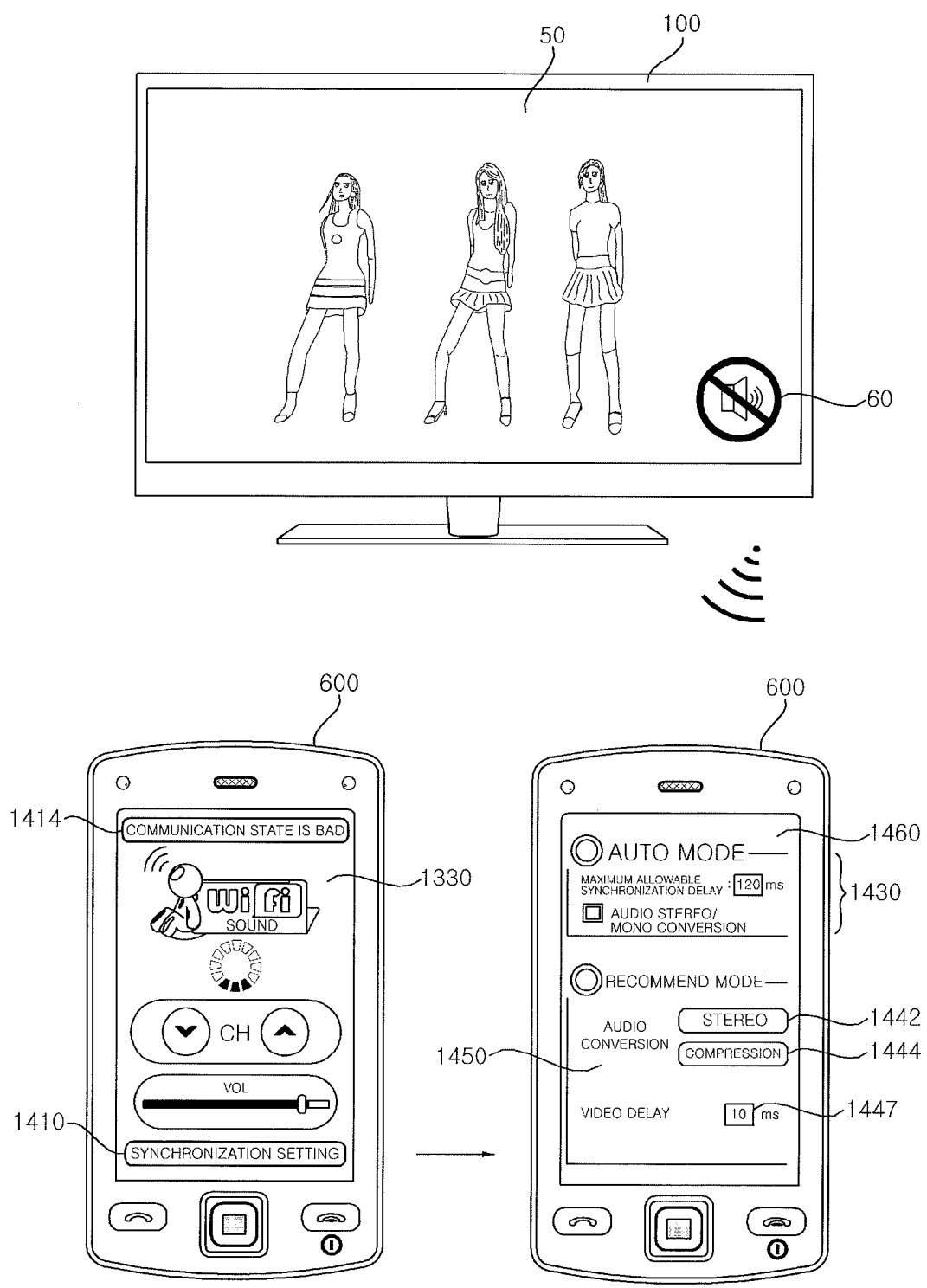

FIGS. 17A to 17C show various examples of synchronization setting of multimedia data played back (or reproduced) by the image display apparatus and audio data played back (or reproduced) by the mobile terminal.

FIG. 17A shows an instance in which the wireless audio reception mode screen 1330 of the mobile terminal 600 includes an object 1332 indicating a wireless audio reception mode, a channel control item 1334, a volume control item 1336 and a synchronization setting item 1410. The synchronization setting item 1410 is further included, as compared to (b) of FIG. 13.

The controller 680 of the mobile terminal 600 may control display of a synchronization setting screen 1420 on the display 651 if the synchronization setting item 1410 is selected.

The synchronization setting screen 1420 may include an automatic mode item 1430 for automatically setting synchronization and a manual mode item 1440 for manually setting synchronization.

In FIG. 17A, the automatic mode item 1430 includes a maximum allowable synchronization delay time item and an automatic stereo/mono change item for changing the number of channels of the received audio data. The maximum allowable synchronization delay item and the stereo/mono change item included in the automatic mode item 1430 may be displayed in a state of being activated, when the automatic mode item is selected.

In FIG. 17A, the manual mode item 1440 includes an item 1442 for changing the number of channels of audio data, an encoding state change item 1444, a playback delay time increase item 1445 of multimedia data played back by the image display apparatus, a playback delay time decrease item 1446 and a playback delay time display window 1447. The items included in the manual mode item 1440 may be displayed in a state of being activated, when the manual mode item is selected.

The item 1442 for changing the number of channels of audio data may be activated only when the channel of the received audio data is a stereo channel after the manual mode item is selected and may be changed to a mono channel by user choice after activation.

The encoding state change item 1444 may be activated only when the received audio data is the encoded audio data of 2) after the manual mode item is selected and may be changed to the demultiplexed audio data of 1) or the decoded audio data of 3) by user choice after activation.

FIGS. 17B to 17C show the instance in which the synchronization setting screen for setting synchronization of the audio data played back by the mobile terminal is changed and displayed according to a wireless environment between the image display apparatus and the mobile terminal.

FIG. 17B shows display of an object 1412 indicating that a wireless environment is good on the display 6510 of the mobile terminal 600 if the wireless environment is good.

If the synchronization setting item 1410 is selected, since the wireless environment is good, the controller 680 of the mobile terminal 600 may control display of a synchronization setting screen 1420 equal to FIG. 17A on the display 651.

FIG. 17C shows display of an object 1414 indicating that a wireless environment is not good on the display 651 of the mobile terminal 600 if the wireless environment is not good.

If the synchronization setting item 1410 is selected, since the wireless environment is not good, the controller 680 of the mobile terminal 600 may control display of a synchronization setting screen 1460 different from FIG. 17A on the display 651.

As shown, the synchronization setting screen 1460 may include an automatic mode item 1430 for automatically setting synchronization and a recommendation mode item 1450 considering the wireless state.

The maximum allowable synchronization delay time of the automatic mode item 1430 may be set to 120 ms as default in FIG. 17A, but may be set to 80 ms as default in FIG. 17C. That is, at least some of the items for setting synchronization delay of FIG. 17A may be changed according to the wireless environment. Accordingly, it is possible to appropriately set synchronization according to the wireless environment.

The recommendation mode item 1450 may include an item 1442 for changing the number of channels of audio data, an encoding state change item 1444 and a playback delay time display window 1447 of multimedia data played back by the image display apparatus.

A mono channel is recommended as a default value of the item 1442 for changing the number of channels of audio data and the encoded audio data of 2) may be recommended as a default value of the encoding state change item 1444.

In addition, 10 ms may be displayed in the playback delay time display window 1447 as a default value.

The controller 680 of the mobile terminal 600 may change the synchronization setting screen or at least some items of the synchronization setting screen for setting synchronization of the audio data played back by the mobile terminal in consideration of the wireless environment. Thus, it is possible to appropriately set synchronization according to the wireless environment.

Figure 18:
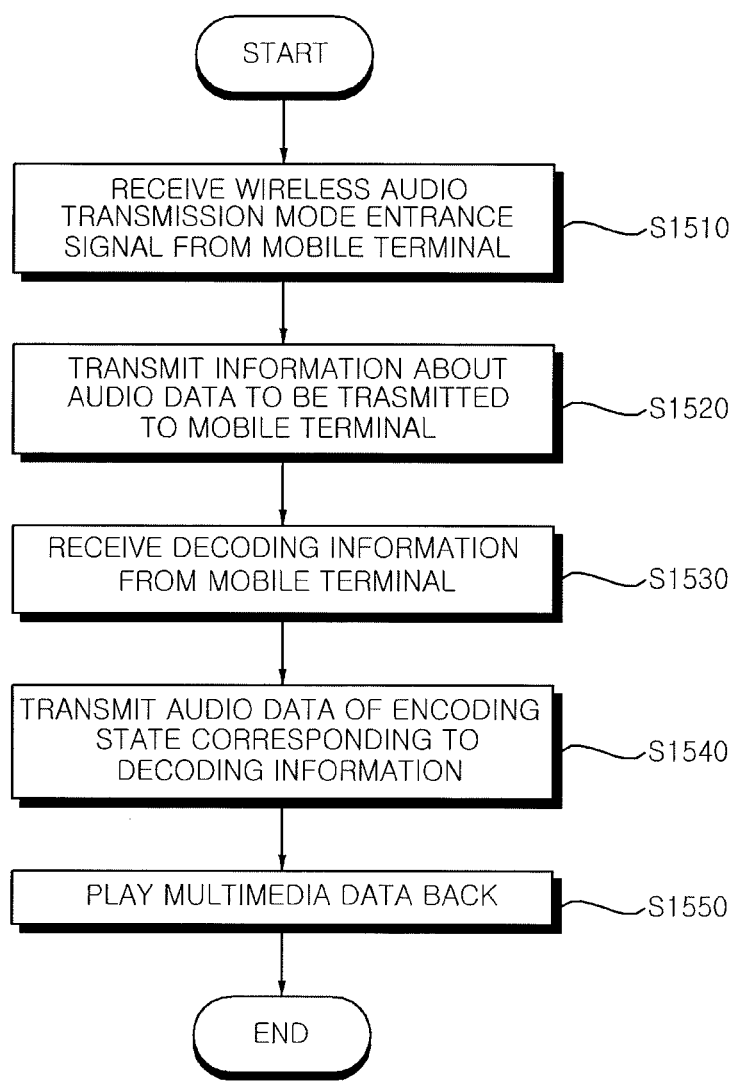
FIG. 18 is a flowchart illustrating a method for operating an image display apparatus according to another embodiment of the invention.

FIG. 18 is a flowchart illustrating a method for operating an image display apparatus according to another embodiment of the invention.

Referring to FIG. 18, the controller 170 of the image display apparatus 100 receives a wireless audio reception mode entrance signal from the mobile terminal 600 (S1510). As described in operation S710 of FIG. 7, the image display apparatus 100 may receive TCP packet data including a wireless audio transmission mode start signal. The TCP receiver 1025 may separate a TCP packet and send the wireless audio transmission mode start signal to the controller 170 of the image display apparatus 100.

Next, the controller 170 of the image display apparatus 100 transmits information about audio data to be transmitted to the mobile terminal 600 (S1520). For example, the TCP receiver 1020 may transmit a TCP packet including information about the number of channels of audio data to be transmitted, encoding state information, encoding scheme information, etc., to the mobile terminal 600.

Next, the controller 170 of the image display apparatus 100 receives decoding information from the mobile terminal 600 (S1530). Audio data of an encoding state corresponding to the decoding information is transmitted (S1540).

The controller 680 of the mobile terminal 600 may generate decoding information indicating whether audio data to be received by the mobile terminal 600 can be decoded using the encoding scheme information of the received information about the audio data. The decoding information is a flag in which a value of "1" may indicate that audio data can be decoded and a value of "0" may indicate that audio data cannot be decoded.

The controller 170 of the image display apparatus 100 receives the decoding information through the TCP receiver 1020. If audio data can be decoded, the controller 170 maintains the encoding scheme of audio data to be transmitted and transmits the audio data to the mobile terminal 600.

The controller 170 of the image display apparatus 100 changes the encoding method of audio data to be transmitted and transmits the audio data to the mobile terminal 600, if the decoding information indicates that the audio data cannot be decoded.

For example, if the encoding scheme of audio data to be transmitted is an AAC encoding scheme and the mobile terminal 600 cannot perform decoding using such an encoding scheme, the image display apparatus 100 receives information indicating that decoding cannot be performed. The image display apparatus 100 may change the encoding scheme of audio data to be transmitted to an AC3 encoding scheme and transmit the audio data to the mobile terminal 600 again. If the mobile terminal 600 can decode the audio data using the AC3 encoding scheme, information indicating that decoding can be performed may be transmitted to the image display apparatus 100. Thus, the image display apparatus 100 may control transmission of the audio data of the AC3 encoding scheme to the mobile terminal 600.

The encoding scheme may be changed by changing a source of audio data to be transmitted. That is, the encoding scheme may be changed by changing audio data to be transmitted from the audio data of ① of FIG. 11 to the audio data of ③ of FIG. 11.

For example, if the encoding scheme of the audio data of ① is an AAC encoding scheme and the encoding scheme of the encoder 1040 is an AC3 encoding scheme, audio data to be transmitted may be changed from the audio data of ① to the audio data of ③ of FIG. 11.

Next, the image display apparatus plays back multimedia data (S1550). In particular, the controller 170 of the image display apparatus 100 may decode a video signal among the demultiplexed audio signal, video signal and data signal and output the video signal to be displayed on the display 180. Thus, the display 180 may display a broadcast image corresponding to the received broadcast signal. At this time, the audio output unit 185 of the image display apparatus 100 may not output a broadcast audio signal corresponding to the received broadcast signal.

Figure 19:
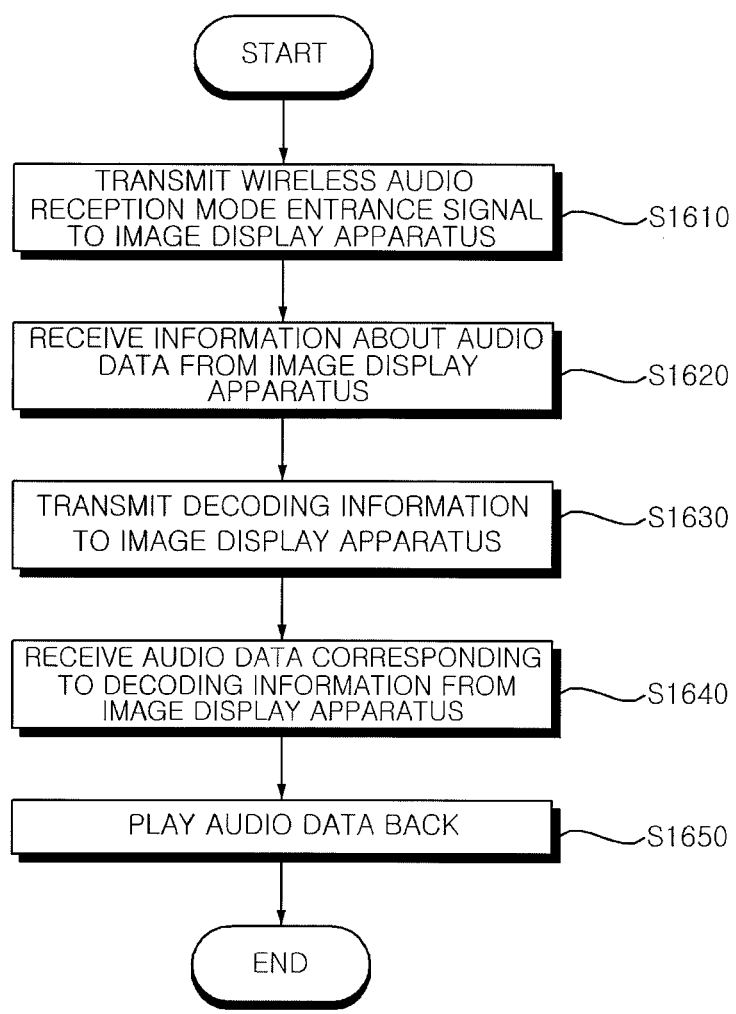
FIG. 19 is a flowchart illustrating a method for operating a mobile terminal according to another embodiment of the invention.
Figure 20:
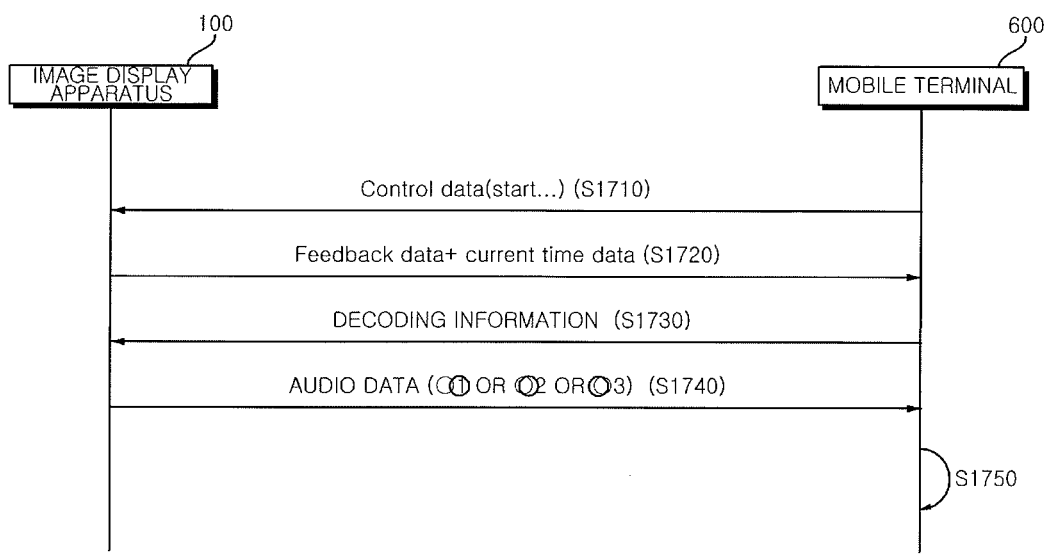
FIGS. 20 to 22 are views referred to for describing various examples of the method for operating the image display apparatus of FIG. 18 or the method for operating the mobile terminal of FIG. 19.
Figure 21:
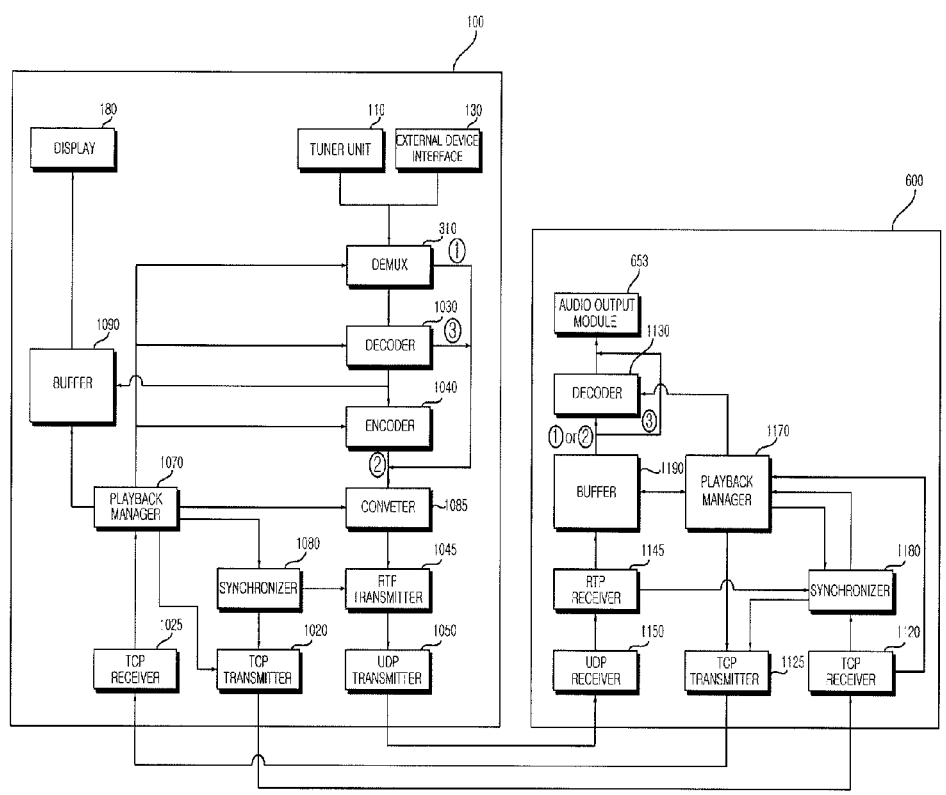
Figure 22:
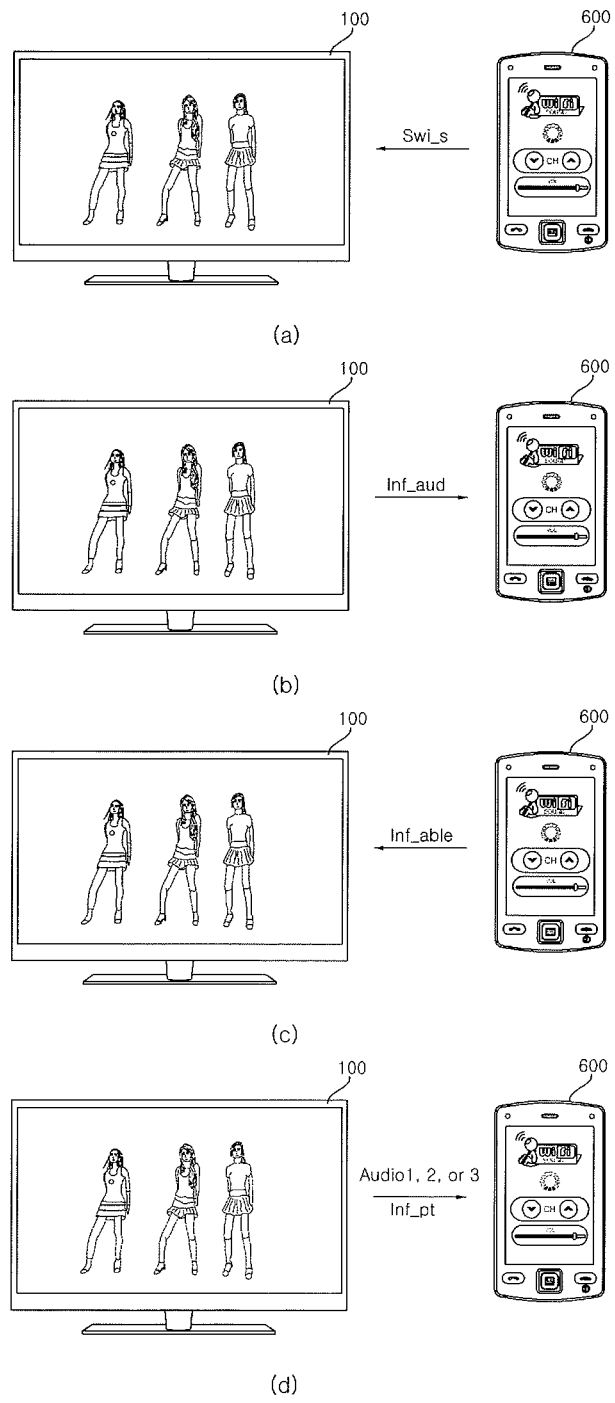

FIG. 19 is a flowchart illustrating a method for operating a mobile terminal according to another embodiment of the invention, and FIGS. 20 to 22 are views referred to for describing various examples of the method for operating the image display apparatus of FIG. 18 or the method for operating the mobile terminal of FIG. 19.

Referring to FIG. 19, the mobile terminal 600 transmits a wireless audio reception mode entrance signal to the image display apparatus 100 (S1610) and receives information about audio data from the image display apparatus 100 (S1620). Operation S1610 corresponds to operation S1710 of FIG. 20 and operation S1620 corresponds to operation S1720 of FIG. 20.

The TCP transmitter 1125 of the mobile terminal 600 may transmit TCP packet data including a wireless audio reception mode start signal to the image display apparatus 100. (a) of FIG. 22 shows transmission of a wireless audio reception mode start signal SWi_s from the mobile terminal 600 to the image display apparatus 100.

The TCP receiver 1025 of the image display apparatus 100 may receive the TCP packet data including the wireless audio reception mode start signal, separate a TCP packet and send the wireless audio reception mode start signal to a playback manager 1070. The playback manager 1070 of the image display apparatus 100 regards the wireless audio reception mode start signal as the wireless audio transmission mode start signal from the viewpoint of the image display apparatus 100.

The playback manager 1070 of the image display apparatus 100 may control transmission of information about audio data to be transmitted to the mobile terminal 600. Thus, the TCP transmitter 1020 of the image display apparatus 100 may transmit the TCP packet including information about the number of channels of audio data to be transmitted, encoding state information, encoding scheme information, etc., to the mobile terminal 600.

(b) of FIG. 22 shows transmission of information Inf_aud about audio data to be transmitted from the image display apparatus 100 to the mobile terminal 600.

The TCP receiver 1120 of the mobile terminal 600 may receive TCP packet data including the information about the audio data, separate a TCP packet and send information about the number of channels of audio data to be transmitted, encoding state information, encoding scheme information, etc., to the playback manager 1170.

Next, the mobile terminal 600 transmits decoding information to the image display apparatus 100 (S1630) and receives audio data corresponding to decoding information from the image display apparatus 100 (S1640). The received audio data is played back (S1650). operation S1630 corresponds to operation S1730 of FIG. 20, operation S1640 corresponds to operation S1740 of FIG. 20, and operation S1650 corresponds to operation S1750 of FIG. 20.

The playback manager 1170 of the mobile terminal 600 may determine whether the decoder 1130 of the mobile terminal 600 can decode audio data to be received based on the received encoding scheme information, etc. The playback manager 1170 of the mobile terminal 600 may control transmission of decoding information indicating whether audio data can be decoded through the TCP transmitter 1125.

(c) of FIG. 22 shows transmission of decoding information Inf_able from the mobile terminal 600 to the image display apparatus 100.

The TCP receiver 1025 of the image display apparatus 100 may receive TCP packet data including decoding information, separate a TCP packet and send the decoding information to the playback manager 1070.

The playback manager 1070 of the image display apparatus 100 may control transmission of audio data corresponding to the received decoding information.

For example, the source of audio data to be transmitted may be changed in correspondence with the received decoding information. That is, the audio data to be transmitted may be changed from the audio data of ① of FIG. 11 to the audio data of ③ of FIG. 11.

For example, if the mobile terminal 600 can perform decoding using an AC3 encoding scheme, the encoding scheme of the audio data of ① is an AAC encoding scheme and the encoding scheme of the encoder 1040 is an AC3 encoding scheme, the playback manager 1070 of the image display apparatus 100 may control a converter 1085 to change the audio data to be transmitted from the audio data of ① into the audio data of ③ of FIG. 11.

The RTP transmitter 1045 and the UDP transmitter 1050 of the image display apparatus 100 may transmit data, to which an RTP packet is attached, and data, to which a UDP packet is attached, to the mobile terminal 600, respectively.

The playback manager 1070 of the image display apparatus 100 may control a synchronizer 1080 such that playback point-of-time information of audio data to be transmitted and current time information are transmitted to the mobile terminal 600. The playback point-of-time information and the current time information are output from the synchronizer 1080. Then, the TCP transmitter 1020 of the image display apparatus 100 may transmit a TCP packet including playback point-of-time information and current time information to the mobile terminal 600.

(d) of FIG. 22 shows transmission of audio data Audio_1, 2 or 3, playback point-of-time information Inf-pt, etc., from the image display apparatus 100 to the mobile terminal 600.

The UDP receiver 1150 and the RTP receiver 1145 of the mobile terminal 600 may respectively separate a UDP packet and an RTP packet such that audio data is sent to a buffer 1190.

The playback manager 1170 of the mobile terminal 600 controls playback of the received audio data.

If the audio data transmitted by the image display apparatus 100 is the audio data of ① or ②, since the audio data was encoded, the audio data is decoded by the decoder 1130 and is provided to the audio output module 653.

As another example, if the audio data transmitted by the image display apparatus 100 is ③, since the audio data was decoded, the audio data is immediately provided to the audio output module 653 without being decoded.

The DEMUX 310, the decoder 1030, the encoder 1040 and the playback manager 1070 of FIG. 21 may be included in the controller 170 of the image display apparatus 100. Among others, the playback manager 1070 may correspond to the processor 330 of FIG. 4. The TCP transmitter 1020, the TCP receiver 1025, the UDP transmitter 1050 and the RTP transmitter 1045 of FIG. 21 may be included in the network interface 135 of FIG. 3. The buffer 1090 may correspond to the memory 140.

The playback manager 1170 of the mobile terminal 600 of FIG. 21 may be included in the controller 680 of the mobile terminal 600. The TCP transmitter 1125, the TCP receiver 1125, the UDP transmitter 1150 and the RTP transmitter 1145 of FIG. 21 may be included in the wireless communication unit 610 of FIG. 3. The buffer 1190 may correspond to the memory 660.

Although the audio signal processed by the RTP receiver 1145 is shown as being output to the decoder 1130 or the audio output module 653 via the buffer 1130 in FIG. 21, if the audio signal processed by the RTP receiver 1145 is an encoded audio signal, the audio signal may be decoded by the decoder 1130 and the decoded audio signal may be stored in the buffer 1190. That is, the buffer 1190 may be interposed between the audio output module 653 and the decoder 1130.

According to an embodiment of the invention, if a wireless audio reception mode start signal is received in a state of displaying a remote control screen for remotely controlling an image display apparatus, a wireless audio reception mode screen is displayed such that a mobile terminal enters a wireless audio reception mode capable of wirelessly receiving audio data from the image display apparatus. Accordingly, it is possible to increase user convenience.

When audio data is received, an object indicating that the audio data is received may be displayed. Accordingly, a user can virtually and conveniently confirm whether the audio data is received.

The received audio data may be displayed as text or a subtitle corresponding to the text. Accordingly, the user can conveniently confirm desired audio data.

If it is detected that an earphone jack is connected to the mobile terminal, the mobile terminal can automatically enter the wireless audio reception mode or display an object indicating whether the mobile terminal enters the wireless audio reception mode, thereby improving user convenience.

A synchronization setting screen for setting synchronization of multimedia data played back by the image display apparatus and the audio data played back by the mobile terminal is displayed, thereby conveniently setting synchronization according to user preference.

Since some of the synchronization setting screen is changed according to a wireless environment between the image display apparatus and the mobile terminal, it is possible to set synchronization according to the wireless environment.

According to an embodiment of the invention, an image display apparatus performs synchronization with a mobile terminal using a first wireless communication method according to wireless transmission mode and transmits extracted audio data to the mobile terminal using a second wireless communication method different from the first wireless communication method. By performing synchronization and audio data transmission using different wireless communication methods, it is possible to efficiently perform wireless audio data transmission. Accordingly, it is possible to improve user convenience.

In particular, if a transmission control protocol (TCP) based communication method is used as the first wireless communication method, it is possible to secure data communication reliability of control data and feedback data.

If a real time transmission protocol (RTP)/user datagram protocol (UDP) based communication method is used as the second wireless communication method, it is possible to enable low-delay streaming of audio data and multi-user support.

By executing the wireless audio transmission mode with respect to the mobile terminal, only a user who wishes to listen to audio data can listen to the audio data and a user which does not wish to listen to the audio data cannot listen to the audio data. Accordingly, it is possible to provide a service according to user preference and improve user convenience.

The image display apparatus and the method for operating the same according to the foregoing embodiments are not restricted to the embodiments set forth herein. Therefore, variations and combinations of the example embodiments set forth herein may fall within the scope of the invention.

The method for operating an image display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

Although the embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating a mobile terminal, the method comprising:
    displaying on the mobile terminal a remote control screen for remotely controlling an image display apparatus;
    entering a wireless audio reception mode if a wireless audio reception mode start signal is received during the displaying of the remote control screen; and
    displaying on the mobile terminal a wireless audio reception mode screen.

2. The method according to claim 1, further comprising:
    receiving audio data from the image display apparatus according to the wireless audio reception mode; and
    playing the received audio data.

3. The method according to claim 2, wherein the wireless audio reception mode screen includes an object indicating that the audio data is received.

4. The method according to claim 2, further comprising displaying at least one of text corresponding to the audio data and a subtitle corresponding to the text.

5. The method according to claim 1, wherein:
    the remote control screen includes a wireless audio reception mode item, and
    entrance into the wireless audio reception mode is performed if the wireless audio reception mode item is selected.

6. The method according to claim 1, wherein the wireless audio reception mode is automatically performed if it is detected that an earphone jack is connected to the mobile terminal.

7. The method according to claim 1, further comprising displaying an object indicating whether the mobile terminal enters the wireless audio reception mode if it is detected that an earphone jack is connected to the mobile terminal,
    wherein entrance into the wireless audio reception mode is performed if a wireless audio reception mode item of the object is selected.

8. The method according to claim 1, wherein the wireless audio reception mode screen includes at least one of a channel control item, a volume control item and a synchronization setting item.

9. The method according to claim 1, further comprising displaying a synchronization setting screen including an automatic mode item for setting synchronization of multimedia data played by the image display apparatus and the audio data played by the mobile terminal, a manual mode item and a recommendation mode item.

10. The method according to claim 1, further comprising changing and displaying a synchronization setting screen for setting synchronization of the audio data played by the mobile terminal according to a wireless environment between the image display apparatus and the mobile terminal.

11. A mobile terminal comprising:
    an audio output module;
    a display configured to display a remote control screen for remotely controlling an image display apparatus; and
    a controller configured to control entrance into a wireless audio reception mode if a wireless audio reception mode start signal is received during display of the remote control screen and to control display of a wireless audio reception mode screen.

12. The mobile terminal according to claim 11, further comprising a wireless communication unit configured to receive audio data from the image display apparatus according to the wireless audio reception mode,
    wherein the controller controls playback of the received audio data.

13. The mobile terminal according to claim 12, wherein the wireless audio reception mode screen includes an object indicating that the audio data is received.

14. The mobile terminal according to claim 12, wherein the controller controls display of at least one of text corresponding to the audio data and a subtitle corresponding to the text.

15. The mobile terminal according to claim 11, wherein:
    the remote control screen includes a wireless audio reception mode item, and
    the controller controls entrance into the wireless audio reception mode if the wireless audio reception mode item is selected.

16. The mobile terminal according to claim 11, wherein the controller controls automatic entrance into the wireless audio reception mode if it is detected that an earphone jack is connected to the mobile terminal.

17. The mobile terminal according to claim 11, wherein the controller controls display of an object indicating whether the mobile terminal enters the wireless audio reception mode if it is detected that an earphone jack is connected to the mobile terminal, and controls entrance into the wireless audio reception mode if a wireless audio reception mode item of the object is selected.

18. The mobile terminal according to claim 11, wherein the wireless audio reception mode screen includes at least one of a channel control item, a volume control item and a synchronization setting item.

19. The mobile terminal according to claim 11, wherein the controller controls display of a synchronization setting screen including an automatic mode item for setting synchronization of multimedia data played by the image display apparatus and the audio data played by the mobile terminal, a manual mode item and a recommendation mode item.

20. The mobile terminal according to claim 11, wherein the controller changes and displays a synchronization setting screen for setting synchronization of the audio data played by the mobile terminal according to a wireless environment between the image display apparatus and the mobile terminal.

* * * * *